United States Patent
Teng et al.

(10) Patent No.: US 9,049,074 B2
(45) Date of Patent: *Jun. 2, 2015

(54) METHOD, APPARATUS AND SYSTEM FOR INITIATING CONFERENCE CALL USING CALENDAR EVENTS

(71) Applicant: Blackberry Limited, Waterloo (CA)

(72) Inventors: Mengshyang Teng, Redwood City, CA (US); Michael S. Colbert, Debary, FL (US); Jeff Zacuto, Foster City, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,125

(22) Filed: Oct. 7, 2013

(65) Prior Publication Data

US 2014/0036733 A1 Feb. 6, 2014

Related U.S. Application Data

(63) Continuation of application No. 12/036,562, filed on Feb. 25, 2008, now Pat. No. 8,582,743.

(60) Provisional application No. 60/891,780, filed on Feb. 27, 2007.

(51) Int. Cl.
*H04M 3/42* (2006.01)
*H04L 29/06* (2006.01)
(Continued)

(52) U.S. Cl.
CPC ........ *H04L 29/06414* (2013.01); *G06Q 10/107* (2013.01); *G06Q 10/109* (2013.01);
(Continued)

(58) Field of Classification Search
CPC ....... H04M 3/465; H04M 3/56; H04M 3/561; H04M 3/562; H04M 3/567; H04M 3/568; H04M 9/001; H04M 2203/5063; H04M 2250/62; H04M 7/006; H04M 7/0063; H04M 3/48; H04M 2203/2072; H04M 7/0054; H04M 3/565; H04W 4/06; H04W 4/08; H04W 4/10; H04L 29/06414; G06Q 10/109; G06Q 10/107

USPC ............ 379/202.01, 204.01, 205.01, 206.01; 370/260; 455/416

See application file for complete search history.

(56) References Cited

U.S. PATENT DOCUMENTS 6,760,423 B1 7/2004 Todd
8,582,743 B2 11/2013 Teng et al.
(Continued)

FOREIGN PATENT DOCUMENTS

| CA | 2679560 A1 | 1/2013 |
| EP | 1047267 A2 | 10/2000 |
| EP | 1372328 A1 | 12/2003 |

OTHER PUBLICATIONS

PCT International Search Report and Written Opinion dated Aug. 5, 2008, issued in International Application No. PCT/US2008/002402, (11 pages).

(Continued)

*Primary Examiner* — Antim Shah
(74) *Attorney, Agent, or Firm* — Fish & Richardson P.C.

(57) ABSTRACT

An email client method and server that allow a conference organizer to schedule a conference (e.g., conference call) using a calendar feature found in today's email applications. When the email client is installed to work with the user's email application, an option becomes available to allow access to a conferencing scheduling feature. The server is adapted to receive an incoming conference request via a data message (e.g., email message) and coordinate acceptances to the request. At the time of the conference, the server retrieves a list of conference participants/attendees and their contact information. The server determines whether or not each participant/attendee is a server participant. If the participant/attendee is a server participant, the server will initiate the conference by calling the multiple contact numbers associated with the participant/attendee. Otherwise, the server will call one contact number associated with the participant/attendee.

15 Claims, 23 Drawing Sheets

(51) Int. Cl.
  *H04M 3/56* (2006.01)
  *H04M 7/00* (2006.01)
  *G06Q 10/10* (2012.01)
  *H04M 3/48* (2006.01)

(52) U.S. Cl.
  CPC .............. *H04M 3/48* (2013.01); *H04M 3/56* (2013.01); *H04M 3/565* (2013.01); *H04M 7/0054* (2013.01); H04M 2203/2072 (2013.01); H04M 2203/5063 (2013.01)

(56) References Cited

U.S. PATENT DOCUMENTS

| | | |
|---|---|---|
| 2004/0218744 A1 | 11/2004 | Nguyen et al. |
| 2005/0021713 A1 | 1/2005 | Dugan et al. |
| 2005/0198140 A1 | 9/2005 | Itoh et al. |
| 2008/0037751 A1 | 2/2008 | Aldrey et al. |
| 2008/0043961 A1 | 2/2008 | Kim et al. |
| 2008/0148276 A1 | 6/2008 | Kerr et al. |
| 2008/0205616 A1 | 8/2008 | Teng et al. |

OTHER PUBLICATIONS

PCT International Preliminary Report on Patentability dated Sep. 1, 2009, issued in International Application No. PCT/US2008/002402, (5 pages).
European Examination Report dated Feb. 9, 2010, issued in European Application No. 08725990.9, (3 pages).
Extendend European Search Report dated Jul. 26, 2010, issued in European Application No. 10167097.4, (5 pages).
Office Action dated Oct. 13, 2011, issued in U.S. Appl. No. 12/036,562, (17 pages).
Final Office Action dated Mar. 1, 2012, issued in U.S. Appl. No. 12/036,562, (17 pages).
Office Action dated Jul. 19, 2012, issued in U.S. Appl. No. 12/036,562, (17 pages).
Final Office Action dated Dec. 6, 2012, issued in U.S. Appl. No. 12/036,562, (20 pages).
Office Action dated Apr. 18, 2013, issued in U.S. Appl. No. 12/036,562, (5 pages).
Notice of Allowance dated Jul. 9, 2013, issued in U.S. Appl. No. 12/036,562, (9 pages).
European Examination Report dated Dec. 13, 2013, issued in European Application No. 10167097.4 (6 pages).

METHOD, APPARATUS AND SYSTEM FOR INITIATING CONFERENCE CALL USING CALENDAR EVENTS

CROSS REFERENCE TO RELATED APPLICATION

This application is a continuation of U.S. patent application Ser. No. 12/036,562, entitled "Method, Apparatus and System for Initiating Conference Call Using Calendar Events," filed on Feb. 25, 2008, which claims priority to U.S. provisional application No. 60/891,780, filed on Feb. 27, 2007, both of which are hereby incorporated by reference in their entirety.

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

BACKGROUND OF THE INVENTION

It has become relatively common for individuals to possess a number of different devices through which they communicate. For example, a person may have a home telephone, a wireless telephone, a pager, a personal digital assistant (PDA), and an office telephone to name a few. As the population becomes increasingly mobile, making contact with a person through one of these communication devices has become more difficult.

Call forwarding is one method of addressing this problem. Certain telephone systems allow users to enter another number to which a voice call is forwarded if not answered by a specified number of rings. This should allow an individual with multiple telephone devices to forward the call to such devices until the telephone at which the individual is located finally rings. However, if several telephones are involved, this approach becomes complicated. Moreover, it requires the calling party to remain on the line for a significant period of time if the call is to be forwarded multiple times. Furthermore, it is necessary that call forwarding capabilities exist on each of the individual's telephones. In addition, this approach requires that all telephones involved be reprogrammed each time an individual desires to initiate call forwarding.

A significant drawback to this forwarding strategy is that, in each leg of the forwarded call, the calling party is terminated on the last device or network in the chain. It follows that the final number in the forwarding scheme is responsible for all available enhanced services or voicemail available to the caller. Accordingly, although a call may have been initially placed to an office telephone equipped with voicemail and/or operator assist, all such enhanced services of the corporate network are lost once the call is forwarded off the corporate PBX (e.g., to the user's wireless telephone).

Travel can exacerbate the difficulty of establishing communication with a team of individuals because of the lack of communication options. Unfortunately, this forces a calling party to decide which person from amongst a team to contact and in which order to do so.

The office telephone is the primary point of contact of most business people and most business features. Typically, corporations invest significantly in their office telephone infrastructure, which often includes voicemail, paging, unified messaging systems and conference calling. In addition, most corporations have negotiated contracts with their telephone carriers (e.g., local and long distance carriers) to ensure that they obtain the lowest possible rates for calls placed via their corporate network. However, because the corporate workforce is becoming increasingly mobile, more business people are using wireless telephones or devices to conduct their business when they are out of the office. This has resulted in corporations spending a larger portion of their telecommunications budget on wireless communications, with far less favorable negotiated rates than the rates of their corporate network. In addition, wireless communication systems often lack the enhanced conveniences (e.g., interoffice voicemail, direct extension dialing, etc.) that corporate users have come to expect in the office environment.

Another valuable feature allowing people in different locations to communicate with each other is a conference call (also referred to as a teleconference). A conference call allows multiple participants to be present on a single call regardless of their locations. To arrange a conference call, a user typically must acquire a call-in conference number from a conferencing service, schedule a time for the conference, obtain a password or number for the conference and send the password/number to all invitees. All invitees are required to call the call-in number at the appropriate time and provide the password/number to initiate/join the conference call. Using this typical technique, however, could take a long period of time for all invitees to join the call, which may delay the start of the call. This technique also requires some logistics to arrange the call and may become burdensome if additional information must be forwarded to the invitees. Thus, another method for arranging a conference is desired.

DETAILED DESCRIPTION OF THE INVENTION

Figure 1:
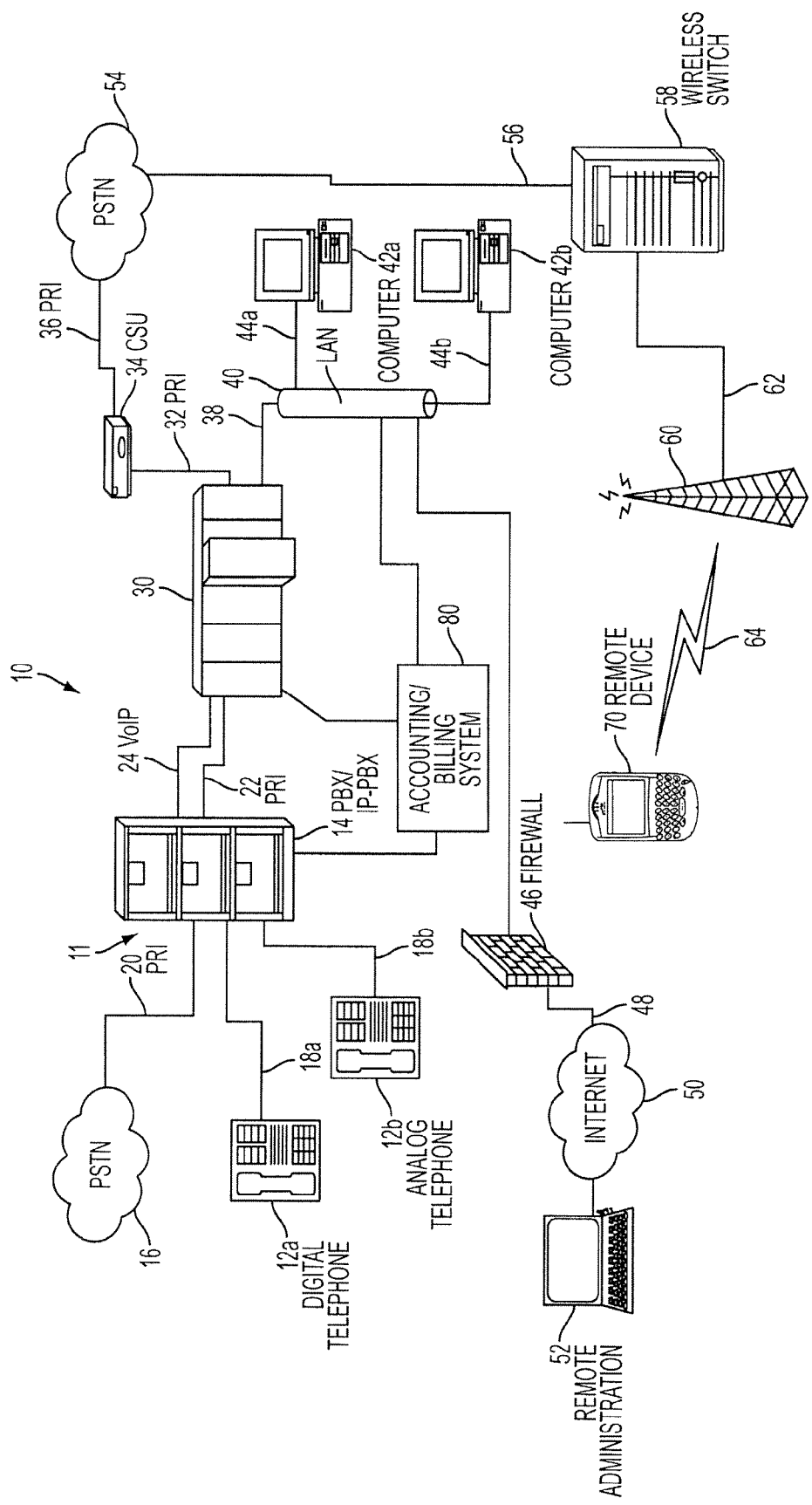
FIG. 1 illustrates an example of a telecommunication system constructed in accordance with an embodiment disclosed herein.

Example embodiments and applications will now be described. Other embodiments may be realized and structural or logical changes may be made to the disclosed embodiments. Although the embodiments disclosed herein have been particularly described as applied to a business or office environment, it should be readily apparent that the embodiments may be embodied for any use or application having the same or similar problems.

Embodiments disclosed herein relate to a telecommunication system that can selectively establish communications with one of a plurality of telephony devices associated with a particular telephone number. Moreover, the system allows remote devices to perform as a functional standard office telephone for both inbound and outbound communications. The system also has a processor configured to send a data signal via electronic mail (email), text messaging, or other forms of data communications to one or more remote devices without any user interaction. The data signal causes a processor and a remote device to execute a series of steps designed to route incoming and outgoing calls based on user preferences and perform PBX functions from the remote device.

Other embodiments disclosed herein relate to an email client method and server that allow a conference organizer to schedule a conference (e.g., conference call) using a calendar feature found in most of today's email applications (e.g., Microsoft® Office Outlook®, IBM® Lotus Notes®, etc.). When a novel email client (disclosed herein) is installed to work with the user's email application, an option becomes available on the email appointment window toolbar that allows the appointment feature to be designated as a conference. The server disclosed herein is adapted to receive an incoming conference request via a data message (e.g., email message). The server coordinates acceptances to the request. At the time of the conference, the server retrieves a list of conference participants/attendees (i.e., invitees and/or the organizer) and their contact information. Once the server has identified all participants/attendees, the server determines whether or not each participant/attendee is a server participant (i.e., if the participant has a user profile registered with the server or its system). If the participant/attendee is a server participant, the server will initiate the conference by calling the multiple contact numbers associated with the participant/attendee. If the participant/attendee is not a server participant, the server will call one contact number associated with the participant/attendee. That is, in one embodiment, the server disclosed herein places calls to the call participants/attendees when it is time to start the conference and then connects the calls together to form the conference.

A first example embodiment is discussed and illustrated with reference to its implementation within an office building, multiple office buildings or other enterprise establishment. In an office building, for example, personnel are assigned to offices (or cubicles) with each office having an associated telephone. The office telephones are typically connected to a PBX, exchange, or other call processing infrastructure. The PBX allows each office telephone to have its own telephone extension and a direct inward dial (DID) telephone number. As known in the art, a telephone extension is typically a three, four or five digit telephone number where station-to-station (i.e., office-to-office) calls can be placed by dialing the three, four or five digit extension. This is commonly referred to as direct extension dialing. As also known in the art, a DID telephone number allows external calls (i.e., calls initiated outside of the office PBX) to be placed directly to the office telephone.

The embodiments disclosed are not to be limited to any particular environment. The embodiments may be implemented, for example, in a hotel, boarding house, dormitory, apartment, or other commercial or residential establishment, where individuals are assigned to a unique extension or DID telephone number. The term "office" as used herein encompasses a singular room or space within a business, other enterprise, hotel room or similar facility. The term "user" as used herein encompasses office personnel, hotel guests or other individuals associated with a telephone extension and DID telephone number.

FIG. 1 illustrates a telecommunication system 10 constructed in accordance with an embodiment disclosed herein. As will be discussed below, the system 10 provides for a full integration of remote telephony devices, such as a remote device 70 (shown in this example as a personal digital assistant (PDA) with wireless voice and data communications (also referred to herein as a mobile device)), into an office, enterprise or hotel PBX or other communications network. The remote device 70 may be any suitable wirelessly enabled handheld remote device. The remote device 70 may be a dual mode (simultaneous data and voice communication capabilities) or single mode communication device, personal digital assistant, etc. such as the device 800 described in further detail below in relation to FIG. 8. Such devices include Blackberry™ devices by Research In Motion Limited of Ontario, Canada, or Palm® Treo™ devices by Palm, Inc. of California, U.S.A. to name a few. In addition, the remote device 70 may be a cellular telephone, etc.

The system 10 can selectively establish communications with one of a plurality of devices associated with a particular telephone extension or DID telephone number. Moreover, the system 10 will allow remote devices 70 such as a mobile device (described below in more detail) to perform as a fully functional standard office telephone 12a, 12b for both inbound and outbound communications. That is, a remote device 70 will be able to use features of the office network (e.g., direct extension dialing, corporate dialing plan, enterprise voicemail etc.) even though the device is not within the confines of the office or not directly connected to the office PBX. The system 10 also allows the remote device 70 to operate as an independent PDA, wireless telephone, etc. if so desired. That is, the remote device 70 may receive calls placed to its (non-office) DID telephone number even though the system 10 also routes PBX calls to the device 70. In addition, the system 10 essentially implements all or part of call management functions typically available on office, enterprise or hotel PBX or other communications network desktop telephone. Some of these features are discussed in detail below.

The system 10 as particularly illustrated herein includes a conventional office PBX network 11. The PBX network 11 may include a plurality of standard telephones 12a, 12b respectively connected to a conventional PBX/IP-PBX 14 via communication lines 18a, 18b. Although PBX network 11 may use a PBX or IP-PBX 14, the following disclosure will simply refer to PBX 14 for convenience purposes. The PBX 14 is connected to a calling network such as a public switched telephone network (PSTN) 16 by a primary rate interface (PRI) connection 20 or other suitable communication line or medium. The standard telephones 12a, 12b can be any digital or analog telephone or other communication device known in the art. As illustrated in FIG. 1, the first telephone 12a is a digital telephone while the second telephone 12b is an analog telephone. For clarity purposes only, two telephones 12a, 12b are illustrated in FIG. 1, but it should be appreciated that any number or combination of telephones or other communication devices can be supported by the system 10. Moreover, although it is desirable to use digital telephones, the invention is not to be limited to the particular type of telephone used in the system 10.

The PBX 14 is coupled to a server 30 constructed in accordance with an embodiment discussed in more detail below. The server 30 is connected to the PBX 14 in this embodiment by a PRI connection 22, VoIP connection 24 (if PBX 14 is an IP-PBX), or other suitable communication medium (e.g., WiFi connection). The server 30 is also connected to a PSTN 54 by a PRI connection or other suitable digital communication medium. The illustrated PRI connection between the server 30 and the PSTN 54 includes a first PRI connection 32, a channel service unit (CSU) 34, and a second PRI connection 36. As known in the art, a CSU is a mechanism for connecting a computer (or other device) to a digital medium that allows a customer to utilize their own equipment to retime and regenerate incoming signals. It should be appreciated that the illustrated connection between the server 30 and the PSTN 54 is one of many suitable connections. Accordingly, the embodiments disclosed should not be limited to the illustrated connection. The server 30 is one of the mechanisms that allows the integration of remote devices (e.g., mobile device 70) into the PBX network 11 and its operation will be described below in more detail. Moreover the server 30 maintains control over inbound, outgoing and in-progress calls and communications.

The server 30 is preferably connected to a local area network (LAN) 40 by an appropriate communication medium 38. Although a LAN 40 is illustrated, it should be appreciated that any other network could be used. A plurality of computers (e.g., 42a, 42b) may be respectively connected to the LAN 40 by any appropriate communication lines 44a, 44b. The computers 42a, 42b can be used by network administrators or others to maintain server 30 and other portions of the system 10. The LAN 40 may also be connected to the Internet 50 by a suitable communication medium 48. A firewall 46 may be used for security purposes. In accordance with an embodiment, Internet 50 can be used to allow a remote administration device 52 (e.g., a personal computer) to perform remote administration of server 30 by office personnel or other authorized users of the system 10. Remote administration will allow office personnel to set user preferences for particular telephone extensions. Thus, each office telephone extension and associated remote device is individually configurable.

PSTN 54 is connected in this embodiment to a commercial wireless carrier (or other carrier not co-located with the system 10) by a wireless switch 58 or other wireless carrier equipment by an appropriate communication medium 56. The wireless switch 58 is connected to at least one antenna 60 (by an appropriate communication medium 62) for transmitting signals 64 to a wireless remote device 70. The wireless remote device 70 could also be a pager, wireless telephone, cellular telephone, or other wireless communication device. It may be desirable for the remote device 70 to be capable of handling both (or either) digital and analog communication signals. It should be noted that any type of wireless communication protocol (or a combination of different protocols), such as TDMA, CDMA, GSM, AMPS, MSR, iDEN, WAP, WiFi, etc., could be used.

It should be appreciated that the server 30 is connected to a wireless carrier through a PSTN 54 and not by unique hardware or an in-office cellular network. As a result, server 30 only has to interface with conventional components, such as the PBX 14 and PSTN 54. Thus, the system 10 is substantially technology independent. Moreover, special wireless devices are not required, which allows the remote device 70 to function in its conventional manner (e.g., as a separate mobile device) and as part of the PBX network 11 (if so desired).

The server 30 and the PBX 14 may also be connected to an accounting/billing system 80. The billing system 80 may also be connected to the LAN 40 so that system administrators may access the contents of the billing system 80. By incorporating a billing system 80 into the system 10, it is possible to obtain immediate billing information for calls placed to/from the remote device 70 or other remote device. This immediate billing feature is not present in other PBX or enterprise networks and is particularly useful for corporate environments such as law firms and government agencies, and hotel environments, where up to date billing information is essential.

Figure 2:
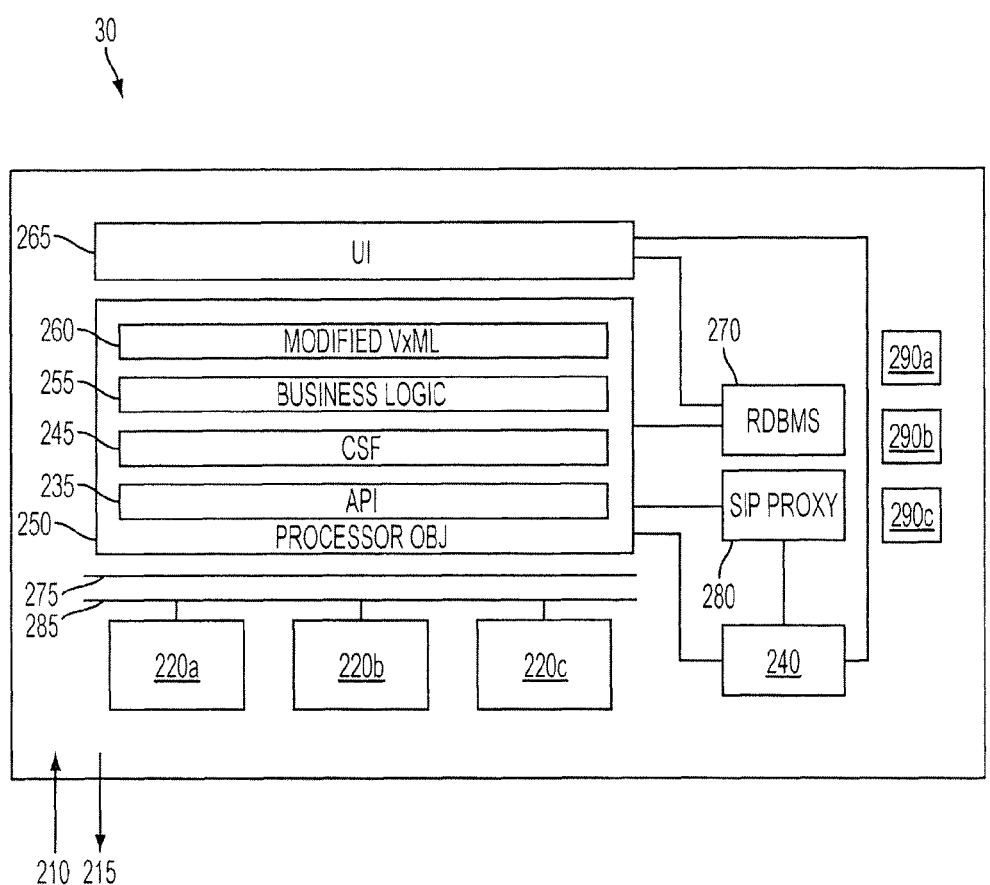
FIG. 2 illustrates a server unit in accordance with an embodiment disclosed herein.

As noted above, the server 30 allows for the full integration of remote devices into the PBX network 11. In accordance with an embodiment, server 30 is a processor-based stand-alone unit capable of handling communications directed to the PBX network 11. In a first embodiment, shown in FIG. 2, server 30 comprises a plurality of receiving and transmitting modules 220a, 220b, 220c, first and second buses 275, 285, at least one processor module (Obj) 250, a network interface card 240 and a memory module operable to comprise a database 270 such as for example, a relational database management system (RDBMS). Further, server 30 can include a web-based user interface (UI) processor module 265, a SIP proxy server module 280 and a plurality of flop files 290a, 290b, 290c. The processor, UI and SIP proxy server modules 250, 265, 280 are processor cards (example hardware components of these cards are described below in more detail with reference to FIG. 4) containing source code, object modules, scripts, or other programming to perform the following functions.

The SIP proxy server module 280 receives session initiation protocol (SIP) messages from user agents and acts on their behalf in forwarding or responding to those messages. In essence, the SIP proxy server module 280 is a gateway for IP-based interfaces to the server 30. The SIP proxy server module 280 also adds services, features and scalability to SIP networks. The SIP proxy server module 280 typically includes a registration service and a SIP location database, in addition to the SIP proxy. Server 30 can receive an incoming call 210 and/or place an outgoing call 215 (described below in more detail). The processor module 250, among other things, directs and instructs the call processing of the server 30. The memory module comprising database 270 is used for storing user preferences and other pertinent information and may be a separate card or included within one of the other modules. The memory module may also be located external to the server 30, if desired, and connected to the server 30 by any wired or wireless communication medium.

Figure 4:
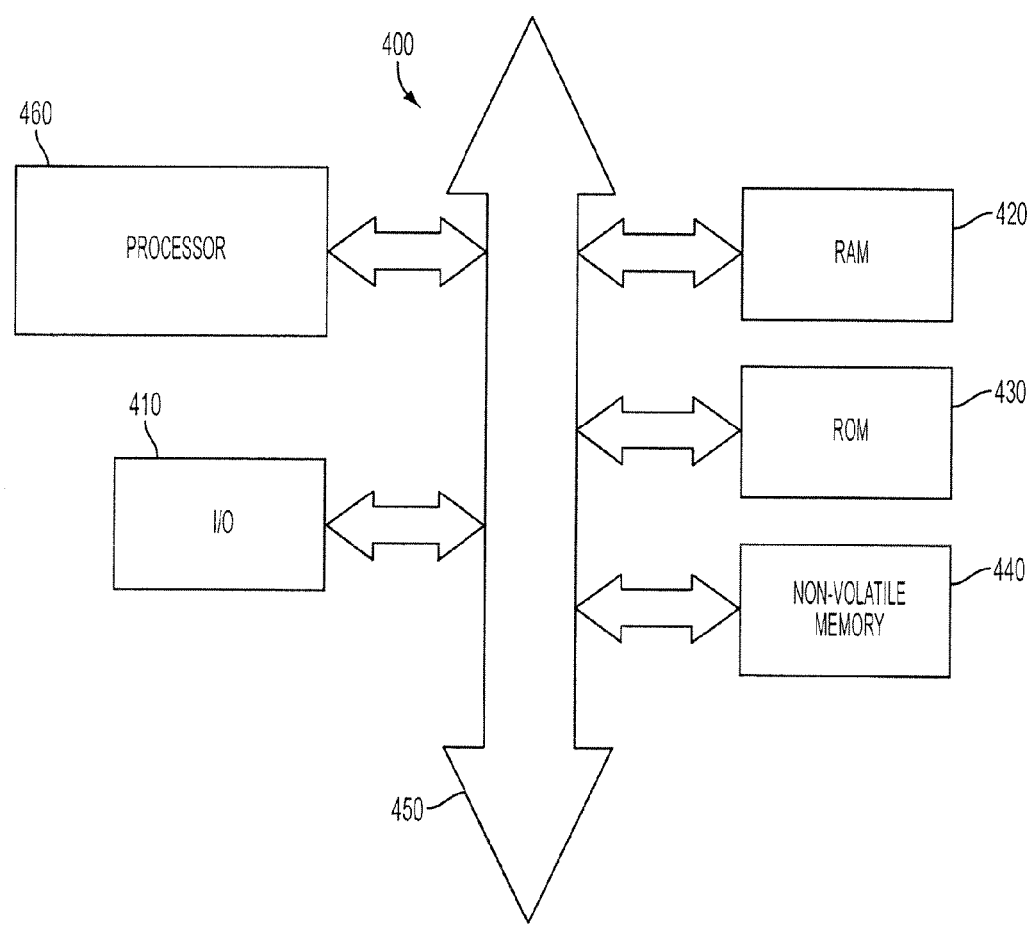
FIG. 4 illustrates a processor module in accordance with an embodiment disclosed herein.

FIG. 4 illustrates an example processor card 400, which may be used for the processor, UI and SIP proxy server modules 250, 265, 280. The card 400 includes a processor 460 for executing the processes of processor module 250 (or the other modules) that communicates with various other devices of the card 400 over a bus 450. These devices may include random access memory (RAM) 420, read-only memory (ROM) 430 and non-volatile memory 440. An input/output device (I/O) 410 provides communication into and out of the card 400. While one input/output device 410 is shown, there may be multiple I/O devices included on the card as desired. Source code, or other programming, comprising applications required by or performed by the components of the server 30 may be stored on one of the computer readable storage media on the card 400 (e.g., ROM 430, non-volatile memory 440) and executed by the processor 460.

The processor module 250 executes one or more computer programs or applications (Obj) stored in one or more memory units within (e.g., as shown in FIG. 4) or coupled to the processor module 250. Processor module 250 can include one or more processes such as a modified VxML 260 call flow process, business logic process 255, call service function (CSF) process 245, and a global application processing interface (API) process 235. It should be appreciated that processor module 250 can include one, all, or any combination of the processes described. The processor module 250 may also contain one or more additional databases and/or other processing memory used during the overall operation of system 10.

In one embodiment, the business logic process 255 can be used for determining whether or not a calling party (incoming or outgoing) is a participant of the server 30 network and allows the server 30 to be flexibly configured by providing routing plans and route translations, IVR prompting and announcements, data manipulation, management and control. In another embodiment, the business logic 255 provides an intelligent call routing function (described below in more detail). The UI module 265 includes processes that provide an easy, but powerful, user interface to administer, configure and manage applications including the management of system, user, conference, notification, IVR and voicemail applications, to name a few.

Figure 3:
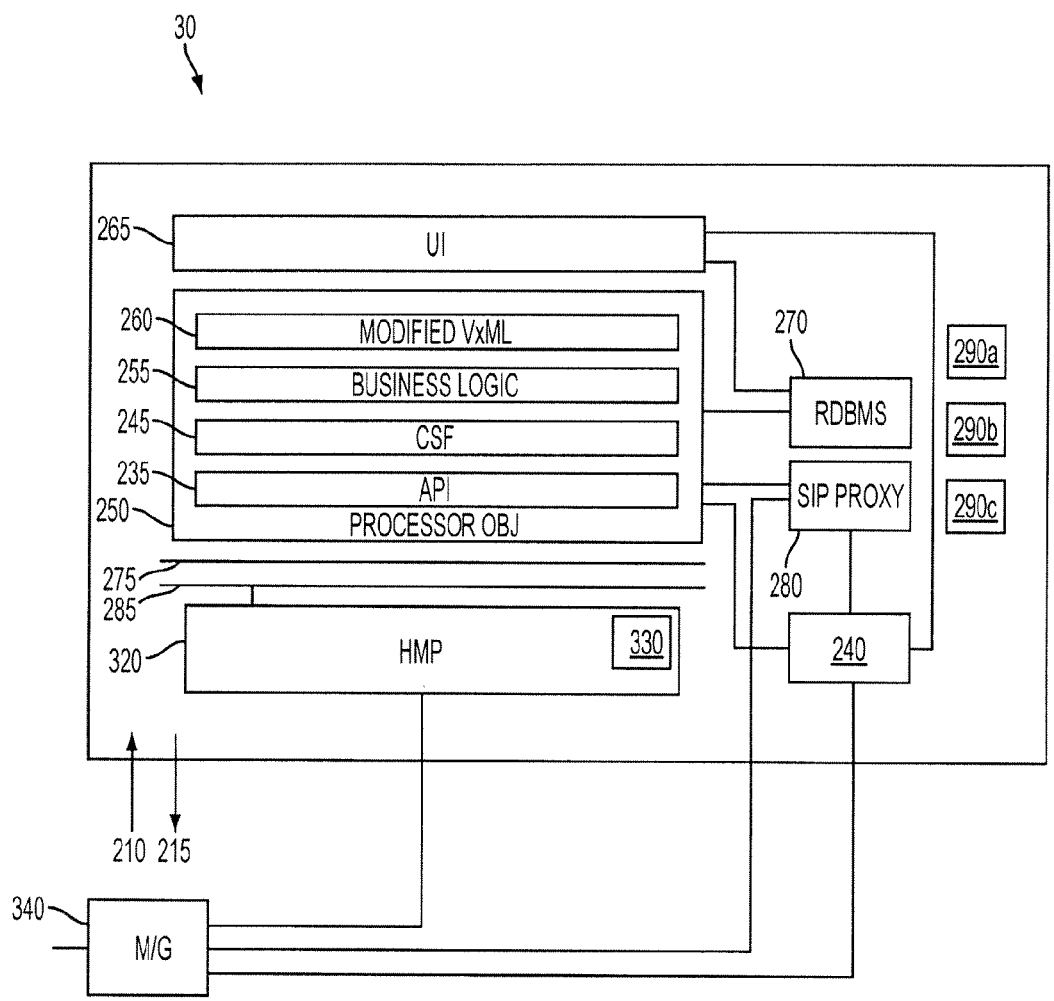
FIG. 3 illustrates a server unit in accordance with another embodiment disclosed herein.

The plurality of receiving and transmitting modules 220a, 220b, 220c communicate with and handle incoming and outgoing telephone calls and are connected along bus 285. In one embodiment, bus 285 is an H100 or similar bus. The receiving and transmitting modules 220a, 220b, 220c may be telephonic cards such as e.g., Intel Dialogic cards, that communicate with processor module 250, database 270 and other components via bus 275 (for example, a PCI bus), which is bridged to bus 285 (bridge not shown), and are employed to receive and transmit information to the PBX 14 and PSTN 54 during call processing. The modules 220a, 220b, 220c also receive and transmit other information such as administrative information. In another embodiment as shown in FIG. 3, the receiving and transmitting modules 220a, 220b, 220c can also be implemented as a processor module 320 such as e.g., a Host Media Processing (HMP) processor having a memory 330 comprising a program that, when executed, causes the processor 320 to perform the desired telephony functions.

In one embodiment, the workload performed by the receiving and transmitting modules 220a, 220b, 220c, as well as some of the processing functions of processor module 250, are implemented using one or more conventional processor-based programmable telephony interface circuit cards (e.g., Intel Dialogic cards) used to interface server 30 with PBX 14 and the PSTN. The cards are programmed to perform the conventional telephony services required to place and receive calls, as well as being programmed to perform the unique call processing functions described below.

The server 30 preferably contains a database of office extension numbers (also referred to herein as PBX extensions) and DID telephone numbers associated with each existing PBX extension. The database will be stored on a computer readable storage medium, which may be part of (e.g., database 270) or connected to the server 30. The database may also contain a server-to-PBX extension (hereinafter referred to as a "SERVER-PBX extension") and one or more remote device telephone numbers associated with each PBX extension. In the illustrated embodiment, software running on the telephony modules 220a, 220b, 220c interfaces with the database to perform the various call processing functions discussed below.

In the embodiment illustrated in FIG. 1, the PBX 14 contains a coordinated dialing plan (CDP) steering table. The CDP steering table will be stored and retrieved from a computer readable storage medium, which may be part of or connected to the PBX 14. The CDP steering table directs the routing of some or all PBX extensions to the server 30 over the PRI 22 and VoIP 24 connections between the server 30 and the PBX 14. In addition, the CDP steering table of the PBX 14 directs the routing of all SERVER-PBX extensions received from the server 30 to the appropriate office telephone.

Figure 5A:
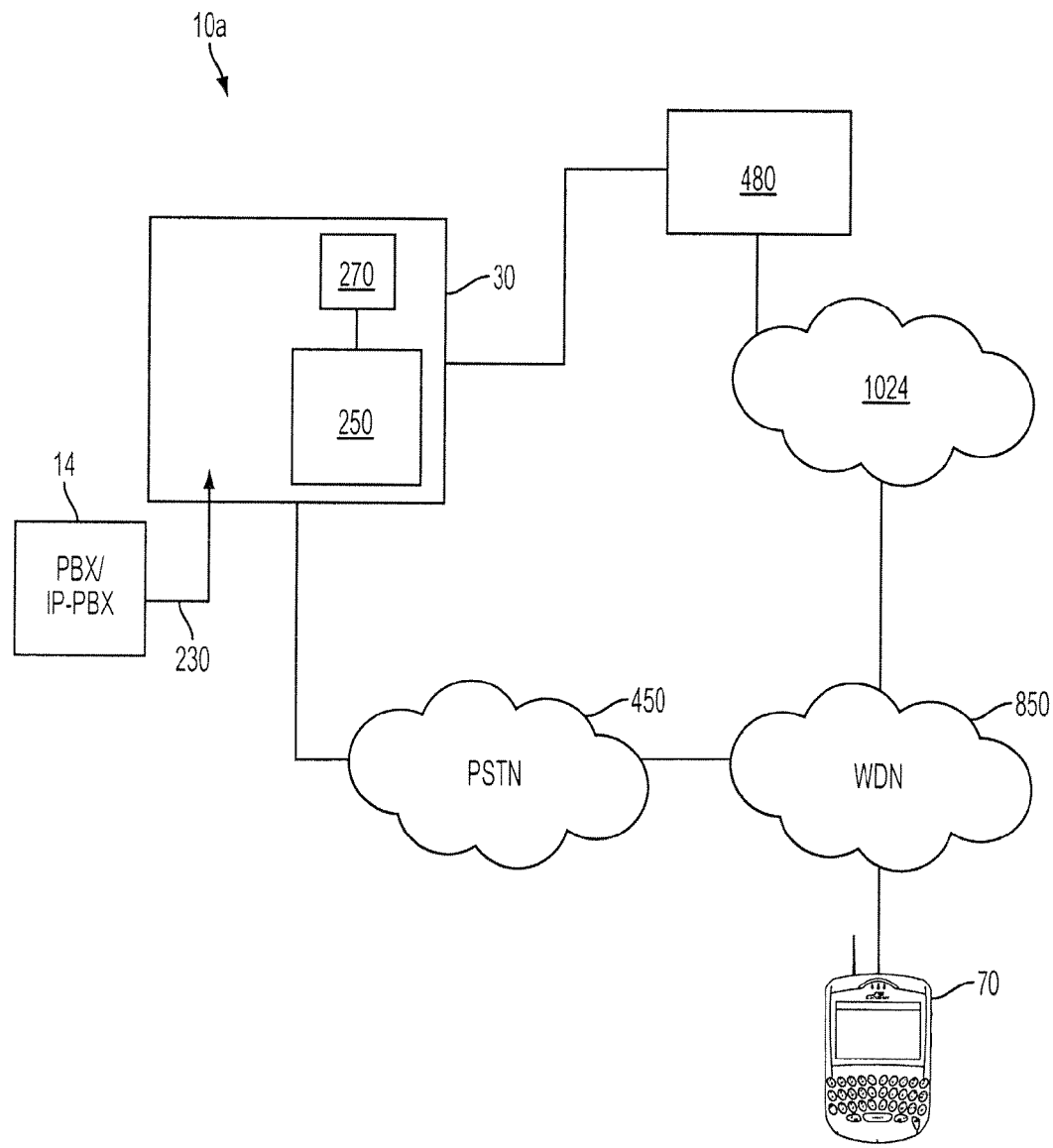
FIG. 5A illustrates another telecommunication system constructed in accordance with an embodiment disclosed herein.

FIG. 5A illustrates another example of a telecommunication system 10a constructed in accordance with another embodiment. System 10a comprises PBX 14, which is connected to server 30, including processor module 250 and database 270, via a PRI connection 230. As stated above, PBX 14 could also be an IP-PBX and thus, there can also be a VoIP connection between the server and PBX 14. There can also be a wireless connection (e.g., WiFi) if desired. Server 30 also includes components from FIG. 2 or 3 as desired, but the components are not illustrated for convenience purposes. The server 30 is connected to remote device 70 via a host system 480, network 1024 and wireless network (WDN) 850 (all of which are described in more detail below with respect to FIGS. 10 and 11). It should be appreciated that the communications between the server 30, host system 480 and remote device 70 may be encrypted to render the information in the communications (i.e., telephone numbers, user login identifications, system information and settings, etc.) indecipherable to the public. Although the use of encryption is desirable, the decision of whether encryption is to be used may be left up to the end user or system administrator of the remote device 70, host system 480 and/or server 30. The host system 480 can include a web services connection (i.e., for the Internet) to provide an interface between the server 30 and remote device 70. The host system 480 can also include a mobile data server (e.g., server 1174 of FIG. 11) for facilitating data communications between the server 30 and remote device 70. A PSTN 450 is also in communication with the server 30 and remote device 70.

The processor module 250 of the server 30 executes one or more programs stored in its associated memory to process calls received through the PBX 14 or PSTN 450. The remote device 70 and host system 480 will also contain a "client" application designed to communicate with the server 30 and perform the following processing in accordance with embodiments described herein. A suitable application architecture for the remote device 70 is disclosed in U.S. application Ser. No. 11/875,212, which is hereby incorporated by reference in its entirety.

Similar to system 10, system 10a essentially implements all or part of call management functions typically available on office, enterprise or hotel PBX or other communications network desktop telephone. Some of these features are discussed in detail below. Moreover, the server 30 maintains control over inbound, outgoing and in-progress calls and communications. Example call processing flows are also disclosed in U.S. application Ser. No. 11/875,212.

It should be appreciated that the interaction between remote device 70 and server 30 can include any call processing telephony functions such as simultaneous ring across multiple devices, single voicemail box, universal voice mail notification, answer acknowledgement, making and receiving a call, abbreviating extension dialing, call hold and retrieval, multiple call appearance, direct inward/outward dialing, post digit dialing, flexible dialing plans/international dialing, caller ID (name, number), voicemail notification, auto reconnect, callback, call forwarding, call transfer, call hold, call waiting, call mute, call blocking, call redial, call parking, speed dial, operator assisted dialing, Do Not Disturb (DND), DND Bypass List (i.e., a list of names/numbers allowed to bypass the do not disturb feature), and DND Ignore List (i.e., a list of names/numbers to always divert to voicemail).

In accordance with an embodiment, the database of server 30 may also contain numerous system-defined user access rights and user modifiable preferences, which can alter the call processing of the invention. An office administrator may use the network computers 42a, 42b or a remote administration device 52 to set user access rights and priorities. The user may use the remote administration device 52 to set numerous user preferences. It is desirable that a Web-based or graphical user interface be used so that the user can easily access and set user preferences. The network computers 42a, 42b (or remote device 52) may also be used by the user if so desired.

Figure 5B:
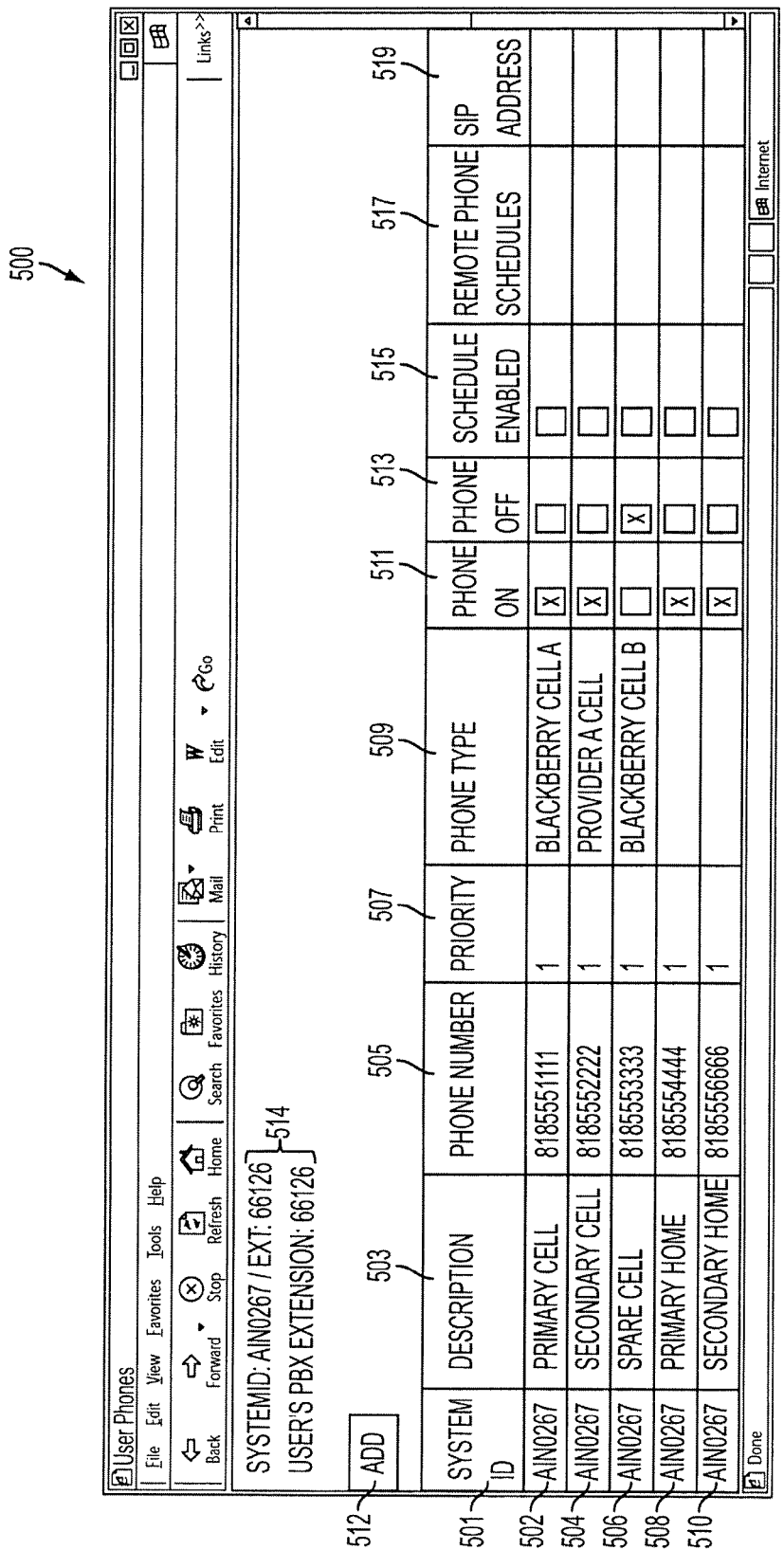
FIG. 5B illustrates an example page allowing a user to associate a plurality of devices to a single extension in accordance with an embodiment disclosed herein.

FIG. 5B illustrates an example of the User Phones preference page 500, which can be used by the user to associate remote telephony devices to the user's extension. As illustrated, the page 500 contains multiple rows 502, 504, 506, 508, 510 of remote devices and their telephone numbers all of which have been associated with the extension "66126" listed in static area 514 of the page 500. Static area 514 also contains a system identifier ("System ID") and a separate field for the user's PBX extension and system extension ("Ext."), which could be different than the PBX extension as described above. It should be appreciated that there are similar pages 500 for other extensions used by the enterprise network and recognized by the server 30. The illustrated page 500 lists the following fields for each row 502, 504, 506, 508, 510 of remote devices/telephone numbers: System ID 501, Description 503, Phone Number 505, Priority 507, Phone Type 509, Phone On 511, Phone Off 513, Schedule Enabled 515, Remote Phone Schedules 517, and SIP Address 519.

The System ID field 501 is used to associate the system's identifier to the user's remote devices. It should be appreciated that different system identifiers could populate the rows 502, 504, 506, 508, 510 and the embodiment is not necessarily limited to the contents of the example page 500. The Description field 503 allows the user to identify or name the device being listed in the row. A descriptive name, for example, can make it easier for the user or system administrator to identify the particular remote device listed in the row. For example, the first row 502 contains a device described as "Primary Cell", which presumably means that the user equates this device to its primary cellular telephone and its telephone number. According to the Phone Type field 509, this user's "Primary Cell" is a Blackberry™ device (i.e., Blackberry Cell A). The Phone Number field 505 associates the Primary Cell's telephone number (i.e., 8185551111) to the user's extension (i.e., "66126").

Once the remote device is turned on using the Phone On field 511, calls can be sent to the remote device 70 via the server 30 as described above and below. The Phone Off field 513 allows the user to prevent calls from being sent to the particular remote device from the server 30. In the illustrated example, the devices listed in rows 502, 504, 508 and 510 are turned on while the device listed in row 506 is turned off (via field 513). Regardless of the settings in fields 511 and 513, the remote devices listed in the rows 502, 504, 506, 508, 510 are still capable of receiving and placing calls using the carrier network or service provider associated with that device.

The illustrated page 500 also includes a Priority field 507, which can be used by the server 30 to determine a priority order among the remote devices listed in the rows 502, 504, 506, 508, 510. In the illustrated example, all of the devices listed in the rows 502, 504, 506, 508, 510 have the same priority (i.e., priority level 1). Another other option available using the page 500 includes enabling schedules for the user's remote devices via the Schedule Enabled and Remote Phone Schedules fields 515, 517. In addition, the page 500 includes a SIP address for any of the user's SIP devices that can be used with the server 30. In the illustrated example, new devices and telephone numbers can be added by pushing the ADD button 512.

Thus, according to FIG. 5B, the user associated with extension "66126" has four remote devices that are active for receiving calls from the server 30 (or placing calls through the server 30): a Primary Cell device that is a Blackberry™ device having the telephone number 8185551111 (row 502); a Secondary Cell device that is a cellular device from provider A having the telephone number 8185552222 (row 504); a Primary Home device having the telephone number 8185554444 (row 508); and a Secondary Home device having the telephone number 8185556666 (row 510). A Spare Cell device that is a Blackberry™ device having the telephone number 8185553333 (row 506) is not active at this time for use with the routing provided by the server 30.

In another embodiment, discussed below, an email client method and the server 30 allow a conference organizer to schedule a conference (e.g., conference call) using a calendar feature found in most of today's email applications (e.g., Microsoft® Office Outlook®, IBM® Lotus Notes®, etc.). When the email client is installed to work with the user's email application, an option becomes available on the email appointment window toolbar that allows the appointment feature to be designated as a conference (instead of the typical meeting appointment). The server 30 is adapted to receive an incoming conference request via a data message (e.g., email message) and coordinates acceptances to the request. At the time of the conference, the server 30 retrieves a list of conference participants/attendees (i.e., invitees and/or the organizer) and their contact information. The server 30 determines whether or not each participant/attendee is a server participant (i.e., if the participant has a user profile registered with the server 30 or its system 10, 10a). If the participant/attendee is a server participant, the server 30 will initiate the conference by calling the multiple contact numbers associated with the participant/attendee. If the participant/attendee is not a server participant, the server 30 will call one contact number associated with the participant/attendee. That is, in one embodiment, the server 30 places calls to the call participants/attendees when it is time to start the conference and then connects the calls together to form the conference. As is discussed below in more detail, this type of conference is referred to herein as a "Get Me" conference.

Another embodiment, discussed below, also allows the organizer to create a conference request in which the participants/attendees must call a call-in number to initiate/join the conference. In this embodiment, the conference request is also created through the email client. As is discussed below in more detail, this type of conference is referred to herein as a "Meet Me" conference.

Figure 6A:
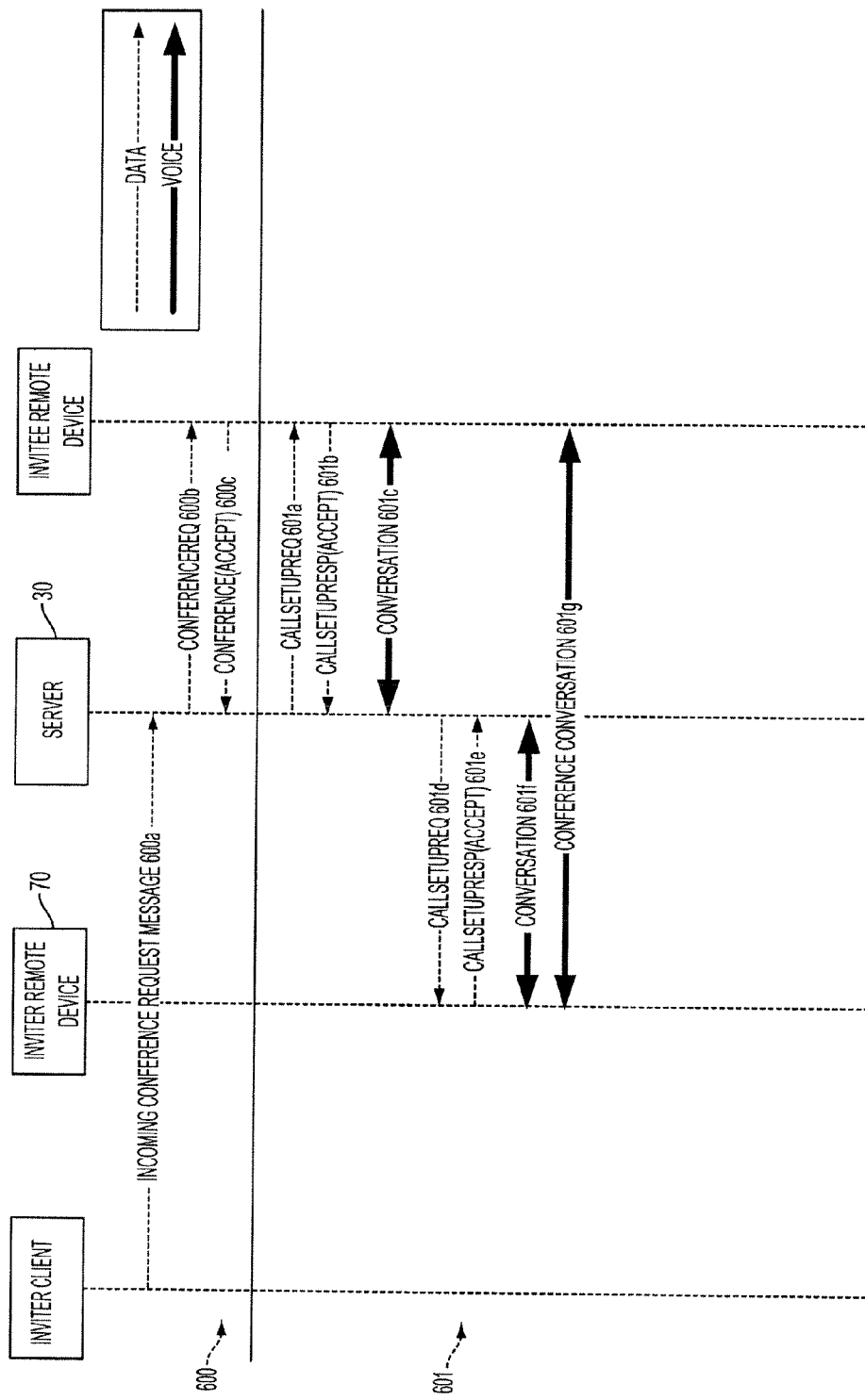
FIG. 6A shows line flow diagrams illustrating an example of the operations performed by embodiments described herein.

In accordance with another example embodiment, FIG. 6A illustrates the basic conference/meeting request message processing flow that the server 30 (via processor module 250), host system 480 and remote device 70 may be programmed to handle and execute. In scenario 600, a user (e.g., inviter) can send a conference/meeting request using the novel email client (described below) designed to work with an email application such as e.g., Microsoft® Office Outlook®, IBM® Lotus Notes®, etc. operating on the inviter's personal computer, office computer or PDA (e.g., Blackberry™). Server 30 receives the incoming conference/meeting request, e.g., an email, from the inviter (flow line 600*a*). Server 30 sends a conference request data message (e.g., email) to the invitee's email address, which can be answered at the invitee's remote device 70 (flow line 600*b*) or other device (e.g., computer) having an email application. The conference request message invites the invitee (also referred to as an attendee by typical email applications) to participate in the requested conference. It should be noted that an inviter does not have to be a participant. He/she could simply be sending the conference/meeting request and serving as an administrator and/or organizer. Accordingly, in one embodiment, the inviter may include him/herself as one of the invitees. In a desired embodiment, however, the inviter will automatically be included in the call, but are not required to be included within a personal conference group (described below).

Figure 6B:
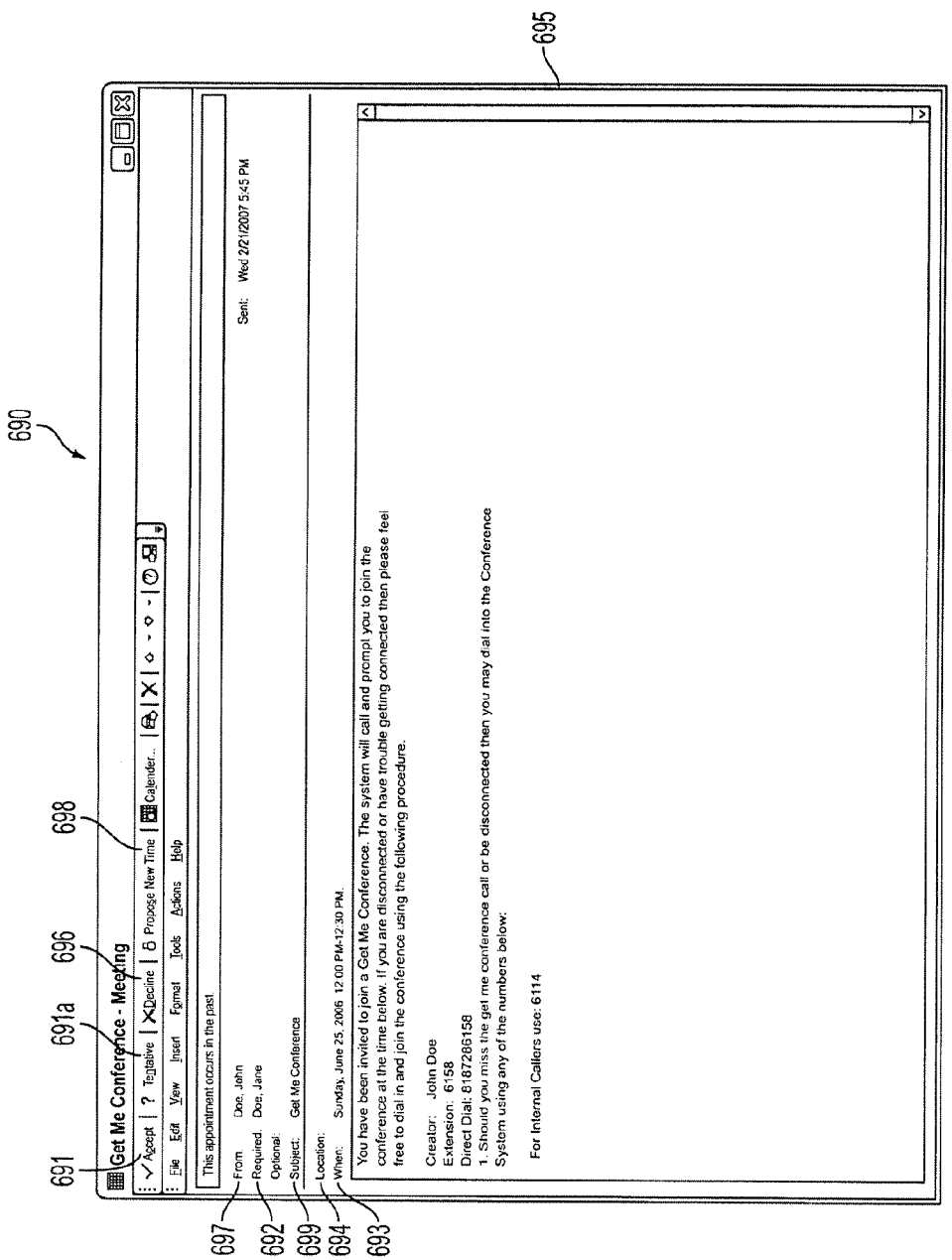
FIG. 6B illustrates an example of notification of a conference request and user options displayable on an invitee's in accordance with an embodiment disclosed herein.

The invitee can choose to participate in the conference by accepting the invitation and having the device 70 (or other computer) send a conference accept response message (e.g., email), to the server 30 (flow line 600*c*). FIG. 6B illustrates an opened email invitation 690 representing a conference request in accordance with an embodiment of the invention. An invitee "accepts" the invitation within the email invitation 690 from e.g., the invitee's remote device 70, by pressing the accept button 691 within the email invitation 690. The invitation 690 may also include fields listing the required participants 692, the inviter 697, the subject of the email 699, the date/time of the conference 693, the conference location 694 (e.g., the system coordinating the conference) and a message (see e.g., messages 737, 755 described below) and any additional information contained in text box 695. An invitee also has the choice to decline the invitation using software button 696, tentatively accept the invitation using button 691*a*, or propose a new date/time using button 698.

In the following example, it is presumed that the inviter has requested a Get Me conference. It is also presumed that participants are using their respective remote devices 70 for the conference call. Referring again to FIG. 6A, in scenario 601, once the conference request has been accepted, and the time for the conference has arrived, the server 30 initiates the Get Me conference by placing calls to each invitee. This is a major improvement over today's conference call features. Server 30 sends a call setup data signal (e.g., email) to a first invitee (flow line 601*a*). The data signal may cause an audible, visual and/or vibration indication to occur on the invitee's remote device 70 (as set by a user or system preference). For example, the call setup request data signal may cause the remote device 70 to play a ring, ring tone or other suitable audible indication. The meeting setup request data signal may cause the device 70 to display a textual or graphical message, pop-up or other visual notification (e.g., blinking LED on the device 70).

Figure 6C:
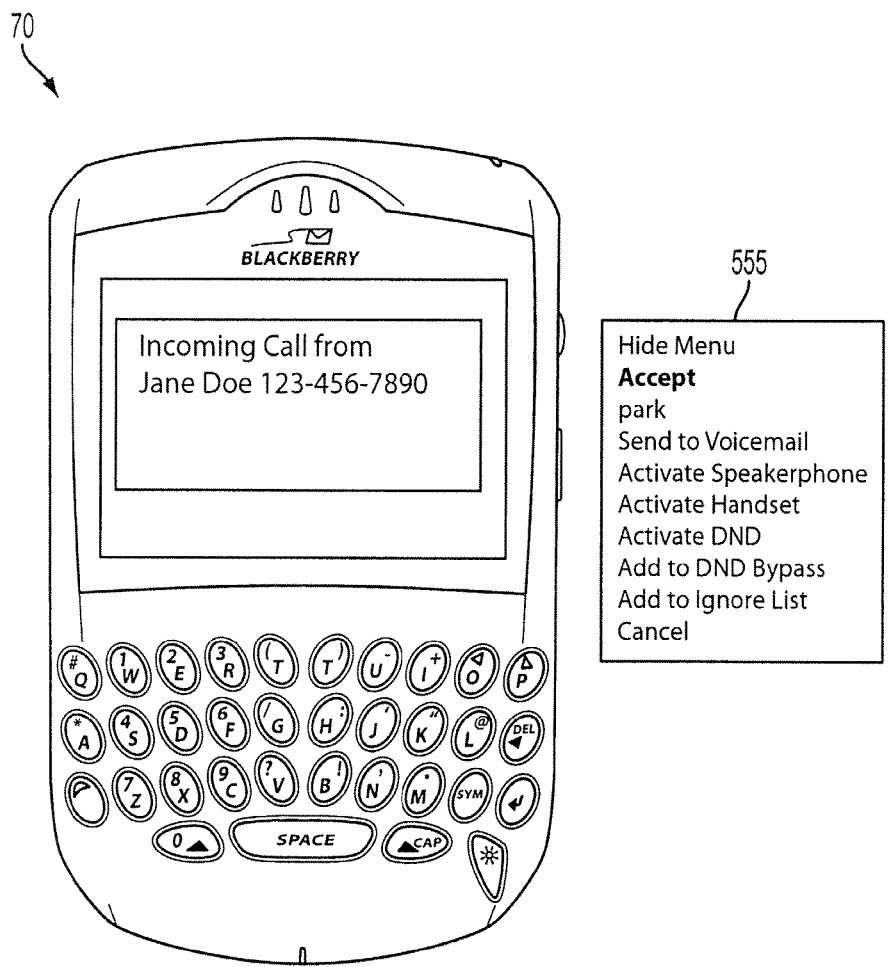
FIG. 6C illustrates an example of an incoming call notification and user options displayable on a remote device.

FIG. 6C illustrates one example call setup notification received at a remote device 70. The notification displays "Incoming Call from Jane Doe 123-456-7890," which in this example is the inviter's telephone contact number. The incoming call being received by remote device 70 will appear and function substantially similar to a typical incoming voice call as described in U.S. application Ser. No. 11/875,212. User responses may include, e.g., "Accept" or "Send to Voicemail." Using options 555, which the user may select at this point, the invitee can accept the incoming call to join the conference causing his/her remote device 70 to send a call setup response accept data signal (i.e., email) to server 30 (flow line 601*b*) to join the requested conference.

If the call is accepted (flow line 601*b*) by the invitee, server 30 will substantially seamlessly connect the invitee's remote device 70 via PSTN connection 450 to server 30 and establishes a voice call connection (flow line 601*c*). In the meantime, server 30 substantially simultaneously, or sequentially (depending upon a system/user option) sends a setup request data signal to the inviter's remote device 70 (flow line 601*d*) inquiring whether or not the inviter would like to join the conference. As described above, the setup request data signal will cause an audible, visual and/or vibration indication to occur on the remote device 70 (as set by a user or system preference).

The inviter can choose to join the conference by accepting the call from the server 30 and by having the device 70 send a setup response accept data signal to the server 30 (flow line 601*e*). This may be performed by selecting "Accept" from the options 555, as illustrated in FIG. 6C. In response, the server 30 will place a call to the inviter's remote device (voice signal flow line 601*f*) and substantially seamlessly connect the inviter's remote device 70 via PSTN connection 450 to server 30.

Server 30 will then connect the two formed connections between server 30 and inviter's remote device (flow line 6010 and server 30 and invitee's remote device (flow line 601*c*) to substantially seamlessly form a single connection to form a conference call (flow line 601*g*). Thus, in the Get Me conference example, a conference call was established by the server 30 without the need for the participants/attendees to call into the conference as is typically required in today's conferencing systems. Thus, the problems associated with conventional conference calls are overcome or substantially mitigated. Moreover, the conference was initiated via email using a calendar function, without the use of a conferencing service. The use of email allows attachments and other information to be sent to the participants.

It should be appreciated that although this embodiment is described as having one invitee (FIG. 6A), server 30 has the capability to contact multiple invitees in response to any meeting request. The number of invitees is determined by the number of participants listed within the conference setup (described below). It should also be appreciated that the server 30 can place calls to other devices such as e.g., a telephone connected to an office extension, a home telephone or a cellular telephone. It should also be appreciated that server 30 can dial multiple contact numbers for each invitee. The contact numbers may be associated with a user profile (discussed above) corresponding to each invitee. Server 30 dials the invitee's contact numbers based on the configuration of the invitee's user profile and/or the conference contact maintained on the inviter's email application. For example, server 30 could dial an invitee's business extension, PDA (e.g., Blackberry™), home phone, etc. Server 30 could dial an invitee's phones based on a number of ring configurations such as simultaneous, sequential, or a combination of simultaneous and sequential as disclosed in U.S. application Ser. No. 09/593,543, which is hereby incorporated in its entirety. Once all participants are connected to server 30 (via an answered device), server 30 connects each individual answered device to a single connection allowing the participants to conduct a conference call.

Figure 6D:
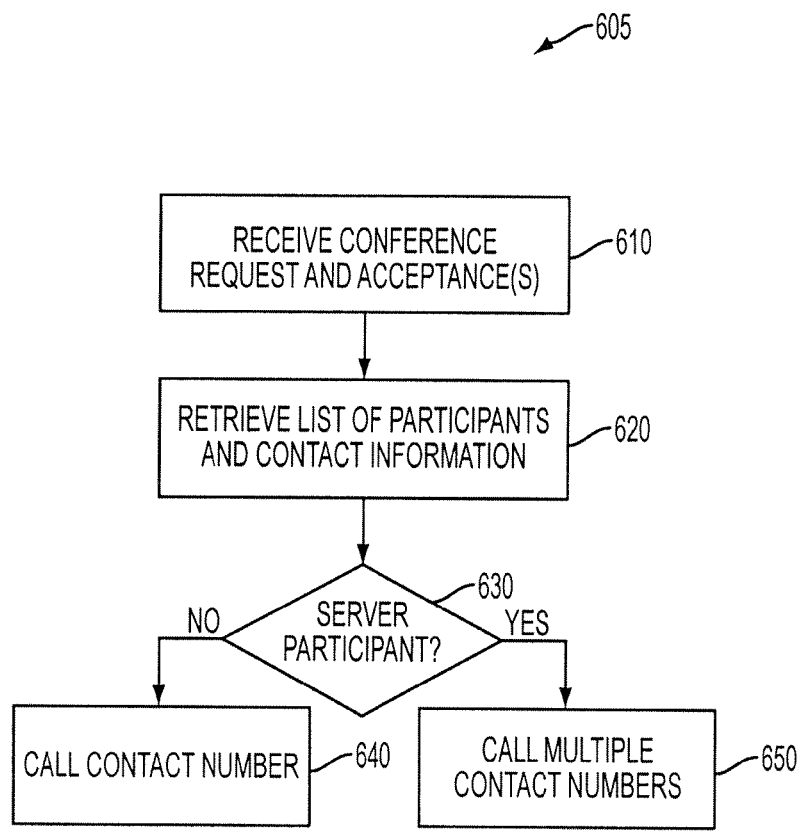
FIG. 6D is a flowchart illustrating an example of the operations performed by embodiments described herein.

In one embodiment, referring to FIG. 6D, server 30 begins its process 605 when it receives an incoming conference/meeting request and the acceptances to the request (step 610). Server 30, at step 620, retrieves the list of participants/attendees (e.g., the invitees and/or the organizer) and their associated conference contact information. Once server 30 has identified all participants, the server 30 determines at step 630 whether or not each participant is a server participant. That is, server 30 determines if a participant has a user profile registered with the server 30 or its system 10, 10*a*. If the participant is a server participant, server 30 places calls to multiple contact numbers associated with that participant (step 650). If the invitee/participant is not a server participant, server 30 places a call to one contact number associated with that participant (step 640).

The embodiments described above are related to an email client method and apparatus that allows a user to schedule a Get Me conference. A Get Me conference is a conference where the server 30 initiates the conference by calling the conference attendees/participants. The email client can also be used to initiate a Meet Me conference, where the participants are invited by email, but are required to call a call-in number. The email client allows the user to schedule a conference via the calendar feature. The embodiments described below are described with a specific example illustrated using Microsoft® Office Outlook®. However, it should be appreciated that the embodiments should not be so limited. These embodiments can also be used in other email applications such as IBM® Lotus Notes®, or Apple® email applications as well as email applications running on mobile devices.

When the email client is integrated with or installed to work with an email application, such as e.g., Microsoft® Office Outlook®, a button or pull-down tab is available on the email application in an Appointment inspector window toolbar that allows the email application Appointment to be designated as a conference. When this button on the toolbar is selected the details of the email application Appointment are communicated to the server 30 and any changes made to the appointment are also communicated to the server 30. Since the illustrated example is based on a Microsoft® Office Outlook® system, it should be noted that Microsoft® Office Outlook® refers to meeting participants as attendees and that some of the illustrations refer to attendees.

Figure 7A:
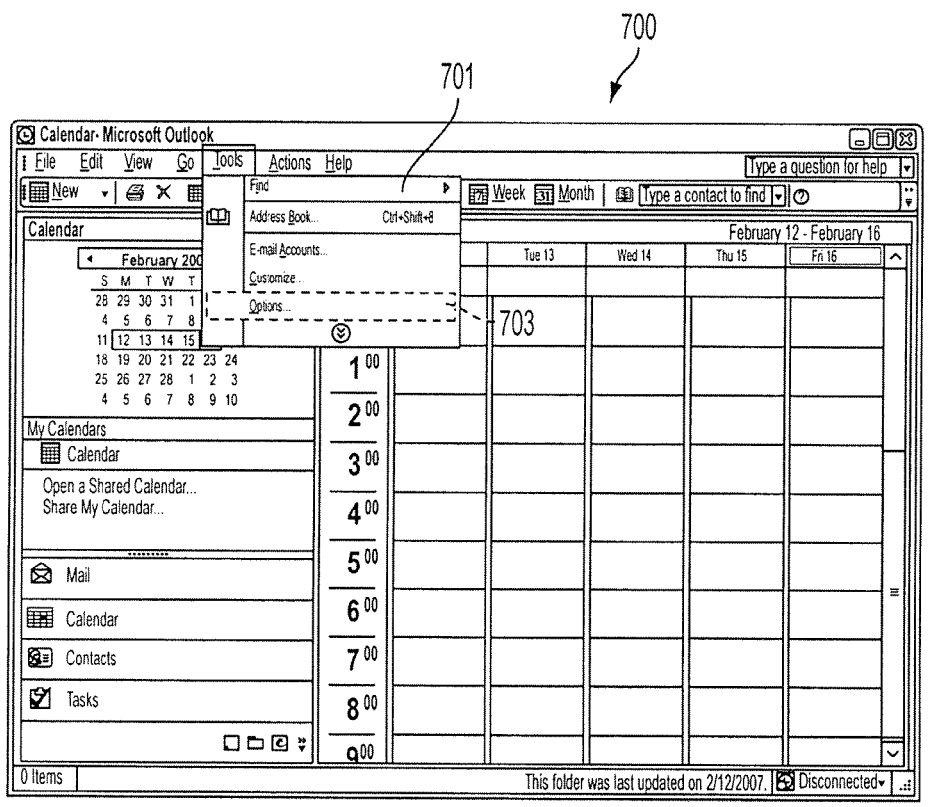
FIGS. 7A-7I illustrate several example screen shots in accordance with example embodiments disclosed herein.
Figure 7B:
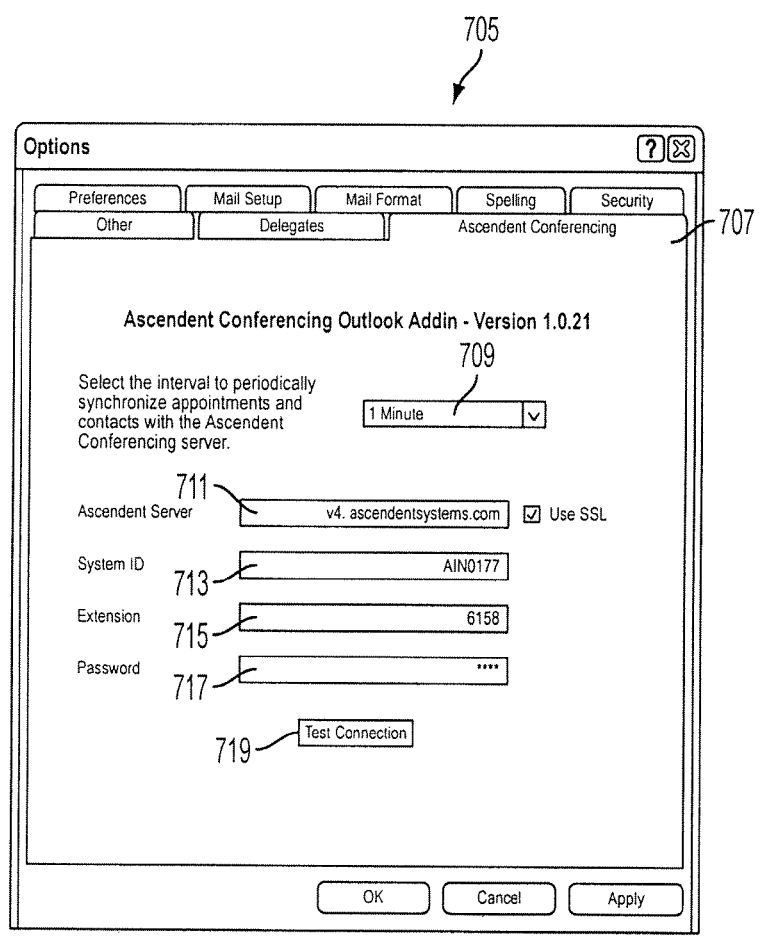

The email client adds an Options tab page to the standard email application Options dialog on the email application Calendar display screen 700 (FIG. 7A). Selecting the "Tools" menu 701 and then the "Options" menu item 703 displays the email application Options dialog 705, as shown in FIGS. 7A and 7B. The "Conferencing" tab 707, displayed in FIG. 7B, provides the user interface for configuring the email client to work with the user's email application and server 30. The settings displayed on this options tab page are stored in a database, i.e., the user's application data directory. The settings for the email application are set at installation and may be changed by the user at any time. For example, the settings may be as follows: Synchronization Interval field 709—The Synchronization interval field 709 specifies the polling interval that the email client will use to communicate with the server 30 to synchronize the information stored in the email client with the information stored in the server 30; Server field 11—This field 711 lists the hostname or IP address of the web server hosting the Web user interface; System ID field 713—This field 713 is the System ID of the server 30; Extension field 715 contains the email client user's extension on the system 10, 10*a*; Password field 717 lists the password on the system 10, 10*a* for the specified extension; Test Connection button 719—This button 719 pulls the settings displayed in the user interface and attempts to contact the server 30 to request a conference PIN. If the request is successful, a message indicating success is displayed. If the request for the PIN is not successful, the error information message is displayed, allowing the user to correct any noted errors in the configuration.

Figure 7C:
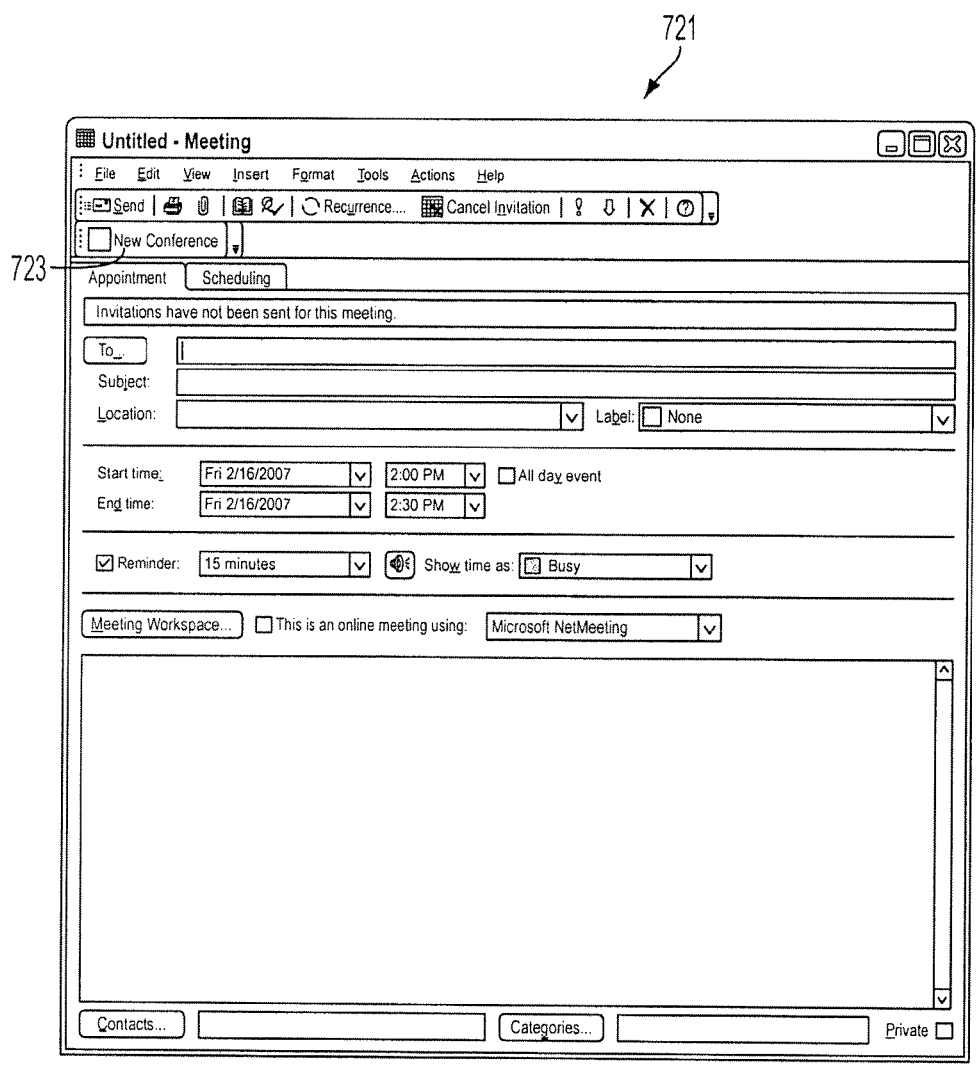
Figure 7D:
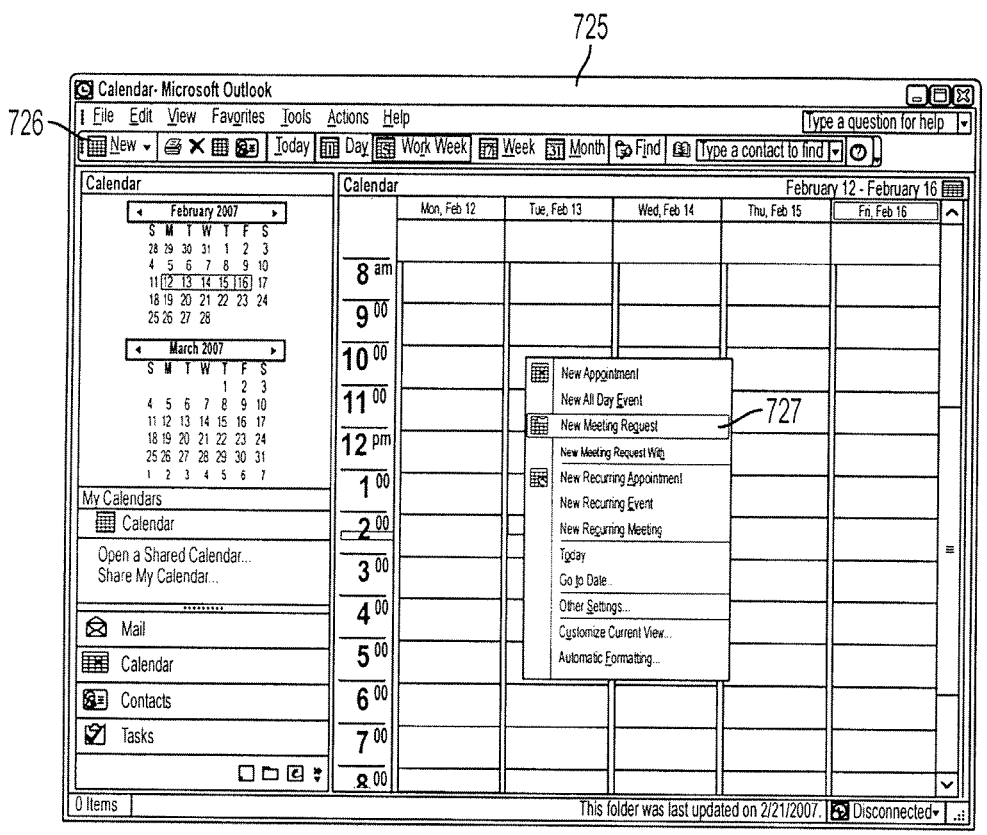
Figure 7E:
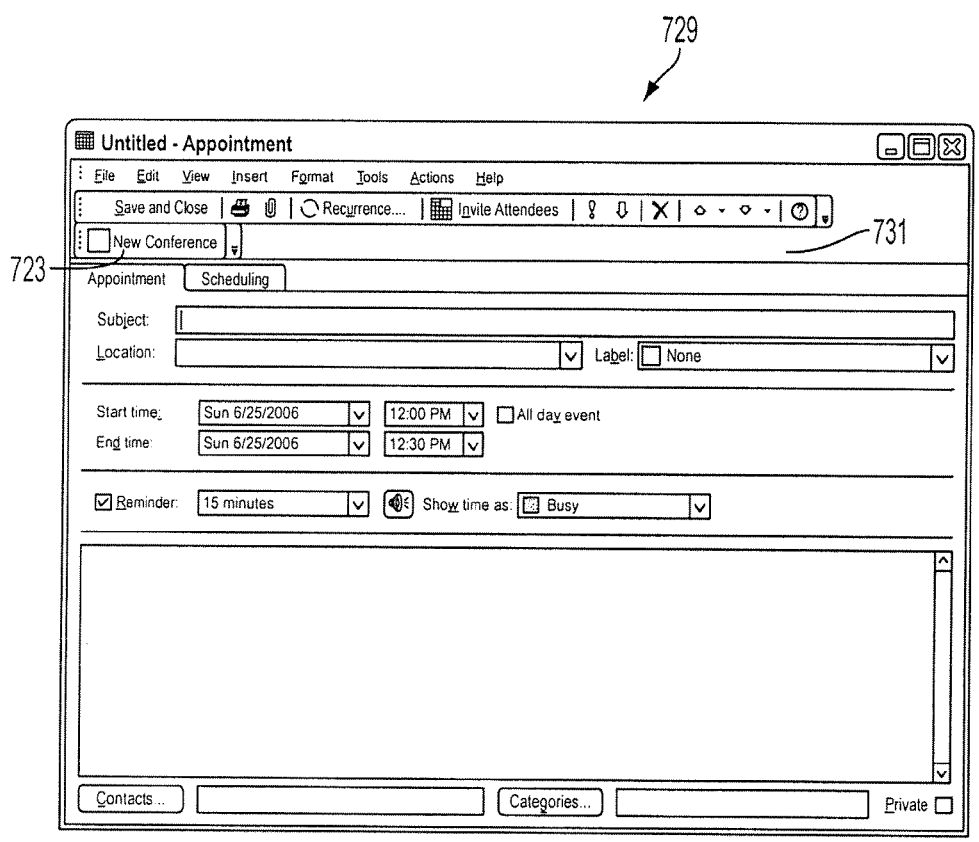
Figure 7F:
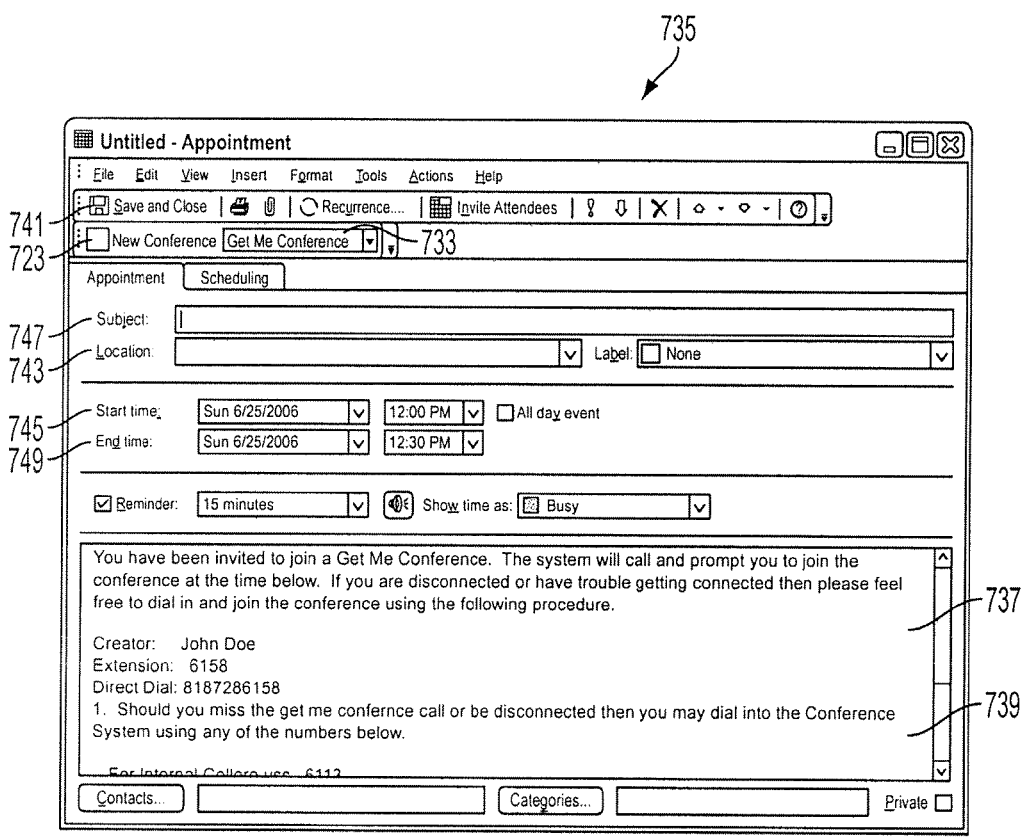

The email client allows the user to schedule a conference via an email application Appointment 721 (FIG. 7C) using the "New Conference button 723. The user creates a new email application Appointment (or selects an existing email application Appointment when changes are necessary), via the email application Calendar feature 725 (FIG. 7D), by selecting the "New Meeting Request" option 727 from a menu (e.g., the "New" menu 726). Then the email application Appointment Inspector user interface 729 is displayed having an email application client toolbar 731, as shown in FIG. 7E. The toolbar 731 contains a button "New Conference" 723. This button 723 will be disabled if the email application Appointment in the inspector dialog occurred in the past, or the email application is in a disconnected state (i.e., not connected to the exchange server). In order to create a conference, the user selects the "New Conference" button 723. Selecting the "New Conference" button 723 requests a conference PIN from the system (not shown). After button 723 is selected, the email application Appointment Inspector 735 appears (FIG. 7F). The user has the choice to send either a "Get Me" conference request or a "Meet Me" conference request (both described below in more detail) using pull down field 733.

Figure 7G:
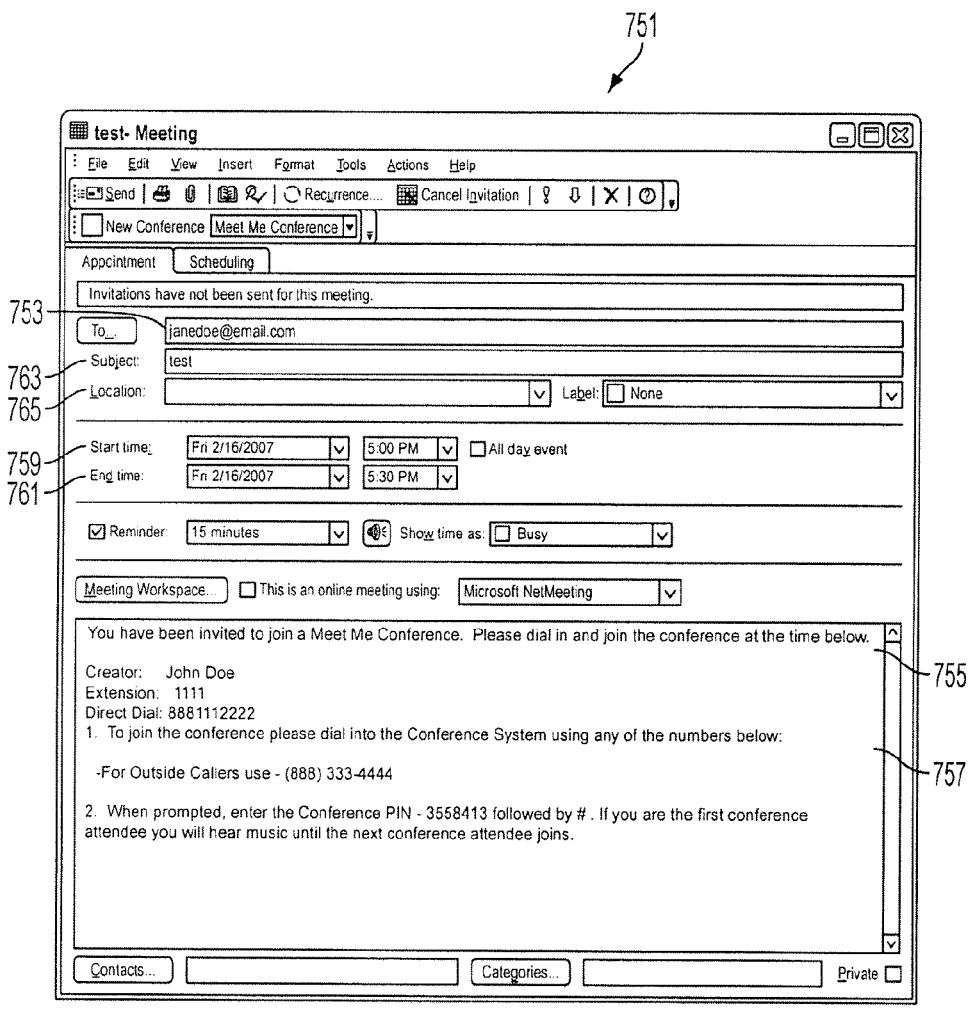

Field 733 provides a dropdown list (not shown) that allows the user to change the conference from a "Get Me" conference to a "Meet Me" conference. A "Get Me" conference is a conference where the server 30 gets an attendee to join a conference at that time. In other words, the server 30 calls the attendees to obtain an immediate connection to the attendee at the requested time. In essence, the server 30 goes out and gets the attendee when the call is to begin. A "Meet Me" conference is where a user proposes a time and place and the attendees are required to call into the conference at that given time. In other words, the server 30 is sending a message to the attendee requesting them to meet the user at a later time. Once a "Get Me" or "Meet Me" conference is selected, the appointment message body 737 is placed into the text box 739 providing the information about the conference. At this point, the user must also provide the start date and time 745, end date and time 749, attendees (not shown), subject 747 and location 743 for the conference. The conference is not scheduled on the server 30 until the user saves the appointment using button 741. Any subsequent changes to the email application Appointment that involve the start date/time 745, end date/time 749, attendees, meeting type ("Get Me" or "Meet Me") 733, subject 747 or location 743 are communicated to the server 30 when the changes to the Appointment are saved by the user. FIG. 7G illustrates the corresponding screen 751, similar to that just described with respect to FIG. 7F, for an email application Appointment associated with a "Meet Me" conference. FIG. 7G includes an email address within attendee box 753 that is not shown in FIG. 7F. The screen 751 also includes the appointment message body 755 that is placed into the text box 757 providing the information about the conference. The boxes for providing the start date/time 759, end date/time 761, attendees 753, subject 763 and location 765 are also shown.

In regards to the conversion of the email application Appointment's attendees to the system's conference participants and non-participants, in order for an attendee to be included in the conference the attendee must have a phone number. The email client programs a business phone, mobile phone and home phone numbers of the attendee (in that order) as the contact numbers for the attendee. If no number is found, the email client will display an error dialog box. It should be noted, however, that the email client can configure an attendee's phone numbers in any order desired by the attendee.

Personal conference groups (PCGs) for the inviter are stored in a "Conferencing Contacts" folder (not shown) in the email application. The email client automatically creates this folder in the same location as the user's standard "Contacts" folder. The email application user can move this folder's location, but cannot delete the folder or modify the contents of the folder. The views are customized to prevent the user from modifying the contents. It is desired that the "Conferencing Contacts" folder be kept separate from the standard "Contacts" folder generally used by the users because of its read-only nature. This folder is populated and modified only by the email client itself, not by the user. This folder will contain a personal conference group entry 767 (FIG. 7H) listing members 773 of the PCG, their name 769 and email address 771. A contact 775 for each of the user's PCG contacts as shown in FIG. 7I and a contact entry 775 for any participants or non-participants members of the PCGs that cannot be matched with existing exchange users or contacts. The user can use the PCG 767 when scheduling conferences by adding a PCG 767 to an appointment in the same way any other "Distribution List" would be added to an appointment. The contact entry 775 comprises for each PCG member a name field 777, email address field 779 and contact phone numbers 781a, 781b, 781c. The numbers can include PBX extensions, home/office phone numbers and wireless device numbers. The folder could also handle other identifying PCG information desired by the user and/or system administrator such as phone numbers.

Figure 7H:
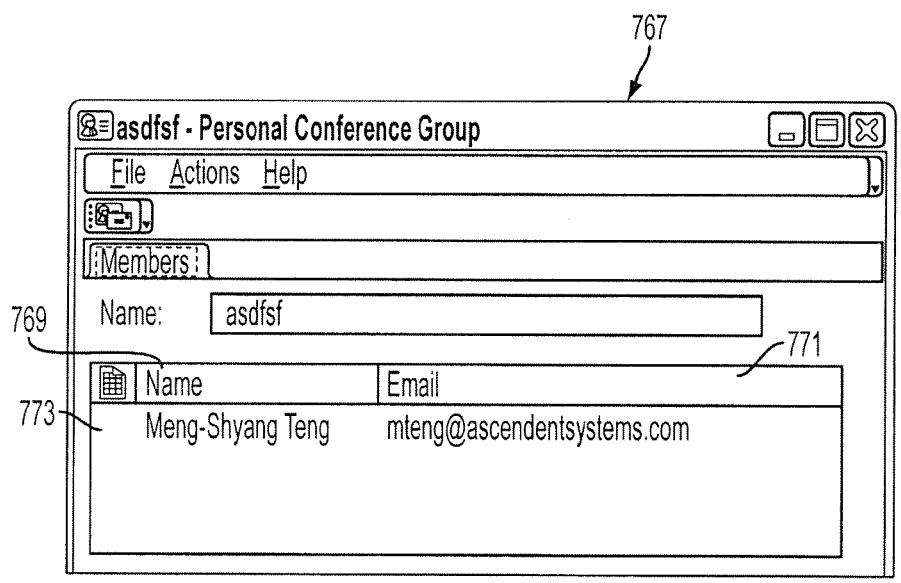
Figure 7I:
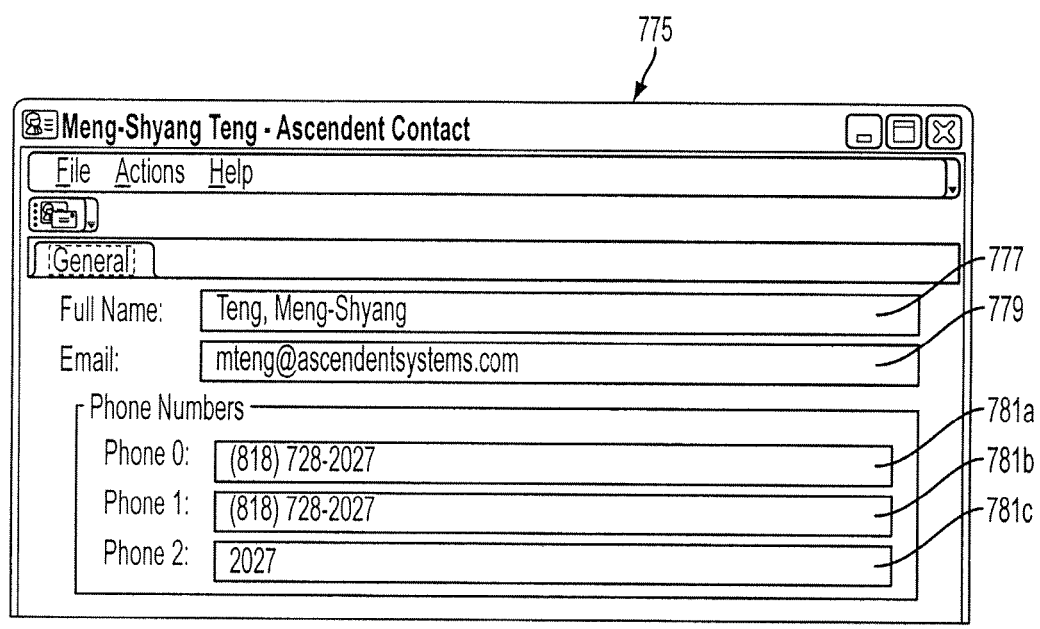

The disclosed inspector view for PCGs 767 in the "Conferencing Contacts" folder is shown in FIG. 7H. The view is very similar to the inspector view for an Outlook® "Distribution List", but with limited actions. The only current action that is supported is to send an email to the members of the PCG.

The contact entry 775 is almost identical to the card view for email application contacts, but displays only the information that is available from the system for each entry 775, i.e., a participant, non-participant or PCG. A Personal Conference Group is represented in this folder as a Distribution List. When the Distribution List is created in an email application the email client gets the list of participants and non-participants for the PCG. The email client tries to match the members of the PCG with existing Exchange users or existing contacts. The match is done using a name 777, email address 779, and/or phone number 781a, 781b, 781c. If no match can be found, the email client will create an email application contact in the "Conferencing Contacts" folder.

The disclosed email client requires the synchronization of the information stored in the email application with the information stored in the system 10a. Once a conference is scheduled, the user may use the Web user interface or the text user interface to change the settings of this conference available through the email application and client. These changes must be then reflected in the email application Appointment. Accordingly, the email client periodically communicates with the server 30 and requests the list of conferences and PCGs so as to synchronize both databases. The returned conferences and PCGs are compared with the appointments and PCGs (Distribution Lists) stored in the email application and any variations are corrected.

In one embodiment, the email client communicates with the server 30 by using HTTP Get messages as is known in the art. The email client can be configured to use HTTP or HTTPS as the communication protocol. The email client also handles redirection to a logon page by the server. When an HTTP Get message is sent to the server 30 and a redirection to a logon.jsp is detected, the email client will respond with an HTTP Post with the appropriate logon information. Once successfully logged on, the original HTTP Get is resent.

Some procedures used by the email client include: outlookList.jsp used to request the list of scheduled conferences and the list of PCGs for a user; sp_OL_PCGMember_GET—used to request the members for a personal conference group; sp_OL_Conference_OneTime_People_Get used to request the one time members of a conference;

sp_OL_Personal_Conference_Group_Call_Insert used to create a conference;

sp_OL_Personal_Conference_Edit—used to update the information in a conference;

sp_OL_Personal_Conference_Delete—used to delete a conference;

sp_OL_Conference_OneTime_People_Insert—used to add an attendee to a conference;

sp_OL_Conference_OneTime_People_Remove—used to remove an attendee from a conference;

sp_OL_Conference_OneTime_Group_Insert—used to add a member to a PCG;

sp_OL_Conference_OneTime_Group_Remove—used to remove a member from a PCG; and sp_OL_Get_Conf_PIN_and_Numbers—used to request a PIN for a conference.

The email client preferably includes the following software applications packages to enhance its performance. The first software package is used by the client to avoid the security popup that is displayed any time an email address is accessed. One suitable example is provided by Redemption (http://www.dimastr.com/redemption). Another software package that may be used is a development tool that generates a wrapper to hide all the complexities of writing a COM Add-in. One example is Add-in Express .NET (http://www.add-in-express.com/add-in-net/) from Afalinasoft. Another software package, also from Afalinasoft, is a package that allows for the email application Explorer and Inspector forms to be customized. For example, ADX Extensions for email application (http://www.add-in-express.com/outlook-extension). The final software package preferably used by the email client is a small set of components that have the look and feel of the email application. A suitable example of these components is QiosDevSuite (http://www.qiosdevsuite.com).

It should be appreciated that the email client will need to be installed and configured to perform the above-noted functions. It is desirable that the email client be installed via the web. The installation is initiated via a menu item on the user's system Web user interface. The email client is packaged into a standard Microsoft® MSI file. An open source bootstrapper may be used. The open source bootstrapper uses XML files to configure the setup process. The general steps of the installation are as follows: (1) the user selects a link that downloads and executes the bootstrapper (ASAddinWebSetup.exe); (2) the bootstrapper uses the designated URL to download the configuration.xml file from the URL; (3) the bootstrapper reads the contents of the configuration.xml file in order to determine the next actions to take; (4) the configuration.xml file indicates that the ASOutlookAddinSetup.msi file should be downloaded via the Web and then executed; (5) the bootstrapper downloads the msi; (6) the bootstrapper executes the downloaded msi; (7) the user steps through the installation screens; and (8) the installation completes.

It should be appreciated that the system could utilize "voice over IP" communications (i.e., voice over a data network) with appropriate remote devices. Many of today's wireless telephones and PDA's have the ability to place and receive cellular and data (voice over IP) telephone calls and to access the Internet or other data network. It should be appreciated that any conventional remote device could be used with system.

Figure 8:
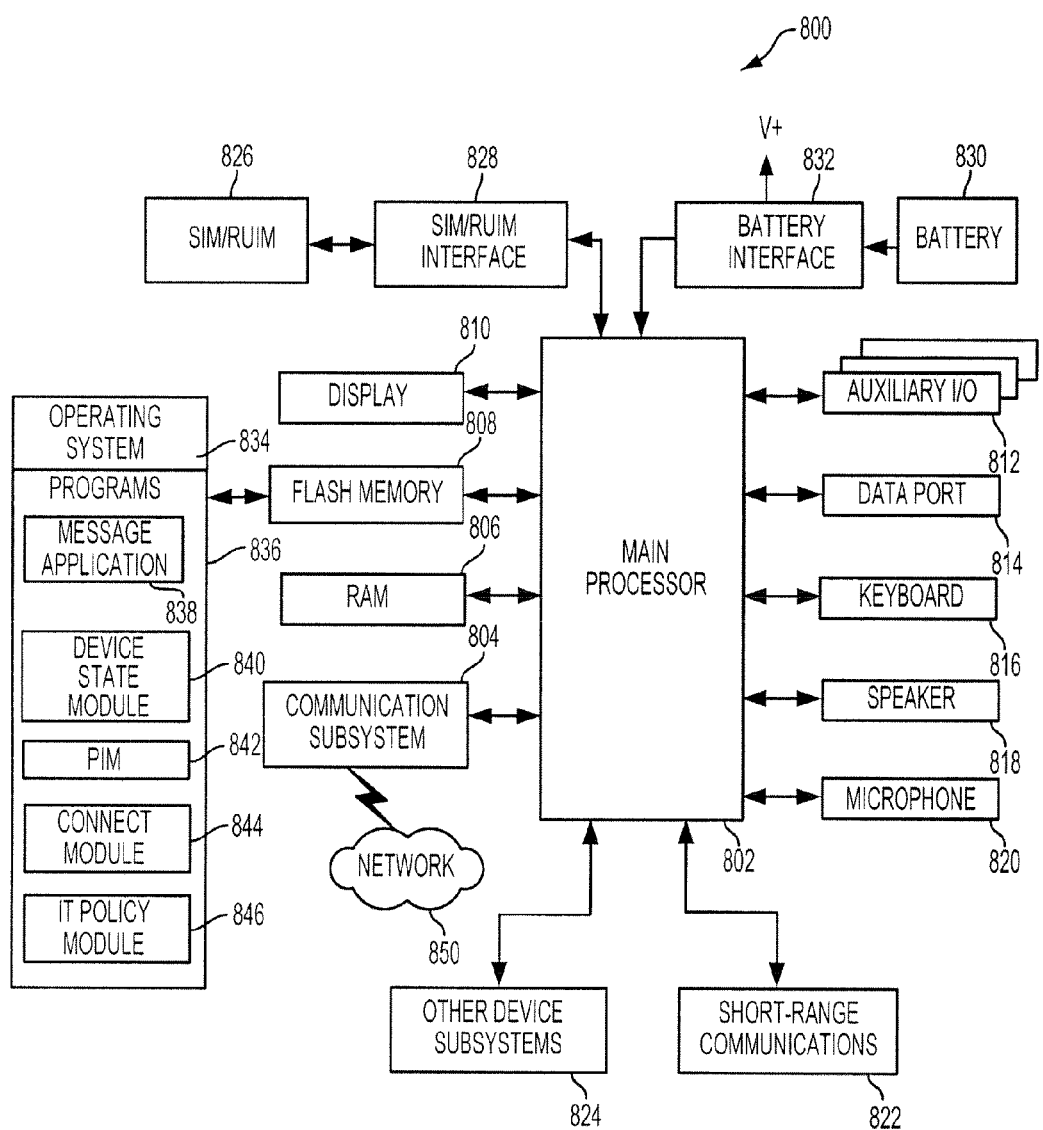
FIG. 8 is a block diagram of an exemplary mobile device constructed in accordance with an embodiment disclosed herein.

In one embodiment, remote device 70 can be implemented as mobile device 800, illustrated in FIG. 8. Mobile device 800 is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device 800 and how it communicates with other devices and host systems, reference will now be made to FIGS. 8 through 11.

Referring to FIG. 8, shown therein is a block diagram of an exemplary embodiment of a mobile device 800. The mobile device 800 includes a number of components such as a main processor 802 that controls the overall operation of the mobile device 800. Communication functions, including data and voice communications, are performed through a communication subsystem 804. The communication subsystem 804 receives messages from and sends messages to a wireless network 850. In this exemplary embodiment of the mobile device 800, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with mobile device 800 is a GSM/GPRS wireless network in one exemplary implementation, other wireless networks may also be associated with the mobile device 800 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a Random Access Memory (RAM) 806, a flash memory 808, a display 810, an auxiliary input/output (I/O) subsystem 812, a data port 814, a keyboard 816, a speaker 818, a microphone 820, short-range communications 822 and other device subsystems 824.

Some of the subsystems of the mobile device 800 perform communication-related functions, whereas other subsystems may provide "resident" or on-device functions. By way of example, the display 810 and the keyboard 816 may be used for both communication-related functions, such as entering a text message for transmission over the network 850, and device-resident functions such as a calculator or task list.

The mobile device 800 can send and receive communication signals over the wireless network 850 after required network registration or activation procedures have been completed. Network access is associated with a subscriber or user of the mobile device 800. To identify a subscriber, the mobile device 800 requires a SIM/RUIM card 826 (i.e. Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the mobile device 800 and to personalize the mobile device 800, among other things. Without the SIM card 826, the mobile device 800 is not fully operational for communication with the wireless network 850. By inserting the SIM card/RUIM 826 into the SIM/RUIM interface 828, a subscriber can access all subscribed services. Services may include: web browsing and messaging such as e-mail, voice-mail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

The mobile device 800 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the mobile device 800. Although current technology makes use of a battery, future technologies such as micro fuel cells may provide the power to the mobile device 800.

The mobile device 800 also includes an operating system 834 and software components 836 to 846 which are described in more detail below. The operating system 834 and the software components 836 to 846 that are executed by the main processor 802 are typically stored in a persistent store such as the flash memory 808, which may alternatively be a read-only memory (ROM) or similar storage element (not shown). Those skilled in the art will appreciate that portions of the operating system 834 and the software components 836 to 846, such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the mobile device 800 during its manufacture. Other software applications include a message application 838 that can be any suitable software program that allows a user of the mobile device 800 to send and receive electronic messages. Various alternatives exist for the message application 838 as is well known to those skilled in the art. Messages that have been sent or received by the user are typically stored in the flash memory 808 of the mobile device 800 or some other suitable storage element in the mobile device 800. In at least some embodiments, some of the sent and received messages may be stored remotely from the device 800 such as in a data store of an associated host system that the mobile device 800 communicates with.

The software applications can further include a device state module 840, a Personal Information Manager (PIM) 842, and other suitable modules (not shown). The device state module 840 provides persistence, i.e. the device state module 840 ensures that important device data is stored in persistent memory, such as the flash memory 808, so that the data is not lost when the mobile device 800 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the mobile device 800 with respect to such items. This can be particularly advantageous when the host computer system is the mobile device subscriber's office computer system.

The mobile device 800 also includes a connect module 844, and an IT policy module 846. The connect module 844 implements the communication protocols that are required for the mobile device 800 to communicate with the wireless infrastructure and any host system, such as an enterprise system, that the mobile device 800 is authorized to interface with. Examples of a wireless infrastructure and an enterprise system are given in FIGS. 10 and 11, which are described in more detail below.

The connect module 844 includes a set of APIs that can be integrated with the mobile device 800 to allow the mobile device 800 to use any number of services associated with the enterprise system. The connect module 844 allows the mobile device 800 to establish an end-to-end secure, authenticated communication pipe with the host system. A subset of applications for which access is provided by the connect module 844 can be used to pass IT policy commands from the host system to the mobile device 800. This can be done in a wireless or wired manner. These instructions can then be passed to the IT policy module 846 to modify the configuration of the device 800. Alternatively, in some cases, the IT policy update can also be done over a wired connection.

The IT policy module 846 receives IT policy data that encodes the IT policy. The IT policy module 846 then ensures that the IT policy data is authenticated by the mobile device 800. The IT policy data can then be stored in the flash memory 806 in its native form. After the IT policy data is stored, a global notification can be sent by the IT policy module 846 to all of the applications residing on the mobile device 800. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

Other types of software applications can also be installed on the mobile device 800. These software applications can be third party applications, which are added after the manufacture of the mobile device 800. Examples of third party applications include games, calculators, utilities, etc.

The additional applications can be loaded onto the mobile device 800 through at least one of the wireless network 850, the auxiliary I/O subsystem 812, the data port 814, the short-range communications subsystem 822, or any other suitable device subsystem 824. This flexibility in application installation increases the functionality of the mobile device 800 and may provide enhanced on-device functions, communication-related functions, or both. For example, secure communication applications may enable electronic commerce functions and other such financial transactions to be performed using the mobile device 800.

The data port 814 enables a subscriber to set preferences through an external device or software application and extends the capabilities of the mobile device 800 by providing for information or software downloads to the mobile device 800 other than through a wireless communication network. The alternate download path may, for example, be used to load an encryption key onto the mobile device 800 through a direct and thus reliable and trusted connection to provide secure device communication.

The data port 814 can be any suitable port that enables data communication between the mobile device 800 and another computing device. The data port 814 can be a serial or a parallel port. In some instances, the data port 814 can be a USB port that includes data lines for data transfer and a supply line that can provide a charging current to charge the battery 830 of the mobile device 800.

The short-range communications subsystem 822 provides for communication between the mobile device 800 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 810 or alternatively to the auxiliary I/O subsystem 812. A subscriber may also compose data items, such as e-mail messages, for example, using the keyboard 816 in conjunction with the display 810 and possibly the auxiliary I/O subsystem 812. The auxiliary subsystem 812 may include devices such as: a touch screen, mouse, track ball, infrared fingerprint detector, or a roller wheel with dynamic button pressing capability. The keyboard 816 is preferably an alphanumeric keyboard and/or telephone-type keypad. However, other types of keyboards may also be used. A composed item may be transmitted over the wireless network 850 through the communication subsystem 804.

For voice communications, the overall operation of the mobile device 800 is substantially similar, except that the received signals are output to the speaker 818, and signals for transmission are generated by the microphone 820. Alternative voice or audio I/O subsystems, such as a voice message recording subsystem, can also be implemented on the mobile device 800. Although voice or audio signal output is accomplished primarily through the speaker 818, the display 810 can also be used to provide additional information such as the identity of a calling party, duration of a voice call, or other voice call related information.

Figure 9:
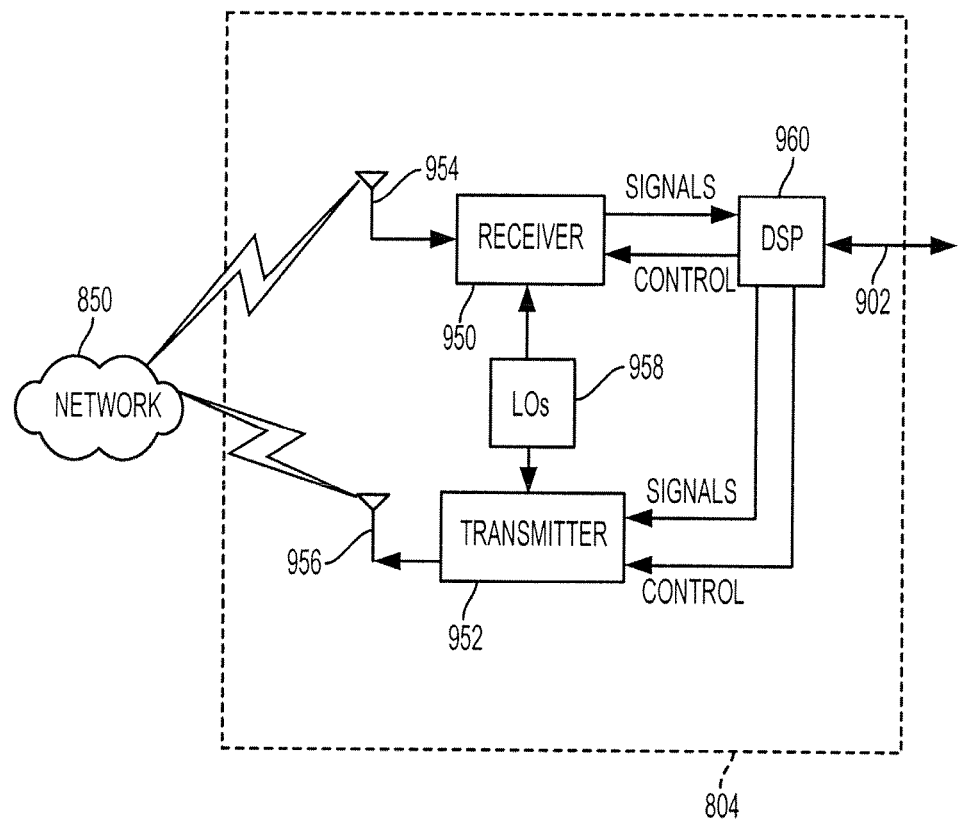
FIG. 9 is a block diagram of an exemplary communication subsystem component of the mobile device in accordance with an embodiment disclosed herein.

Referring to FIG. 9, an exemplary block diagram of the communication subsystem component 804 is shown. The communication subsystem 804 includes a receiver 950, a transmitter 952, as well as associated components such as one or more embedded or internal antenna elements 954 and 956, Local Oscillators (LOs) 958, and a processing module such as a Digital Signal Processor (DSP) 960. The particular design of the communication subsystem 804 is dependent upon the communication network 850 with which the mobile device 800 is intended to operate. Thus, it should be understood that the design illustrated in FIG. 9 serves only as one example.

Signals received by the antenna 954 through the wireless network 850 are input to the receiver 950, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 960. In a similar manner, signals to be transmitted are processed, including modulation and encoding, by the DSP 960. These DSP-processed signals are input to the transmitter 952 for digital-to-analog (D/A) conversion, frequency up conversion, filtering, amplification and transmission over the wireless network 850 via the antenna 956. The DSP 960 not only processes communication signals, but also provides for receiver and transmitter control. For example, the gains applied to communication signals in the receiver 950 and the transmitter 952 may be adaptively controlled through automatic gain control algorithms implemented in the DSP 960.

The wireless link between the mobile device 800 and the wireless network 850 can contain one or more different channels, typically different RF channels, and associated protocols used between the mobile device 800 and the wireless network 850. An RF channel is a limited resource that must be conserved, typically due to limits in overall bandwidth and limited battery power of the mobile device 800.

When the mobile device 800 is fully operational, the transmitter 952 is typically keyed or turned on only when it is transmitting to the wireless network 850 and is otherwise turned off to conserve resources. Similarly, the receiver 950 is periodically turned off to conserve power until it is needed to receive signals or information (if at all) during designated time periods.

Figure 10:
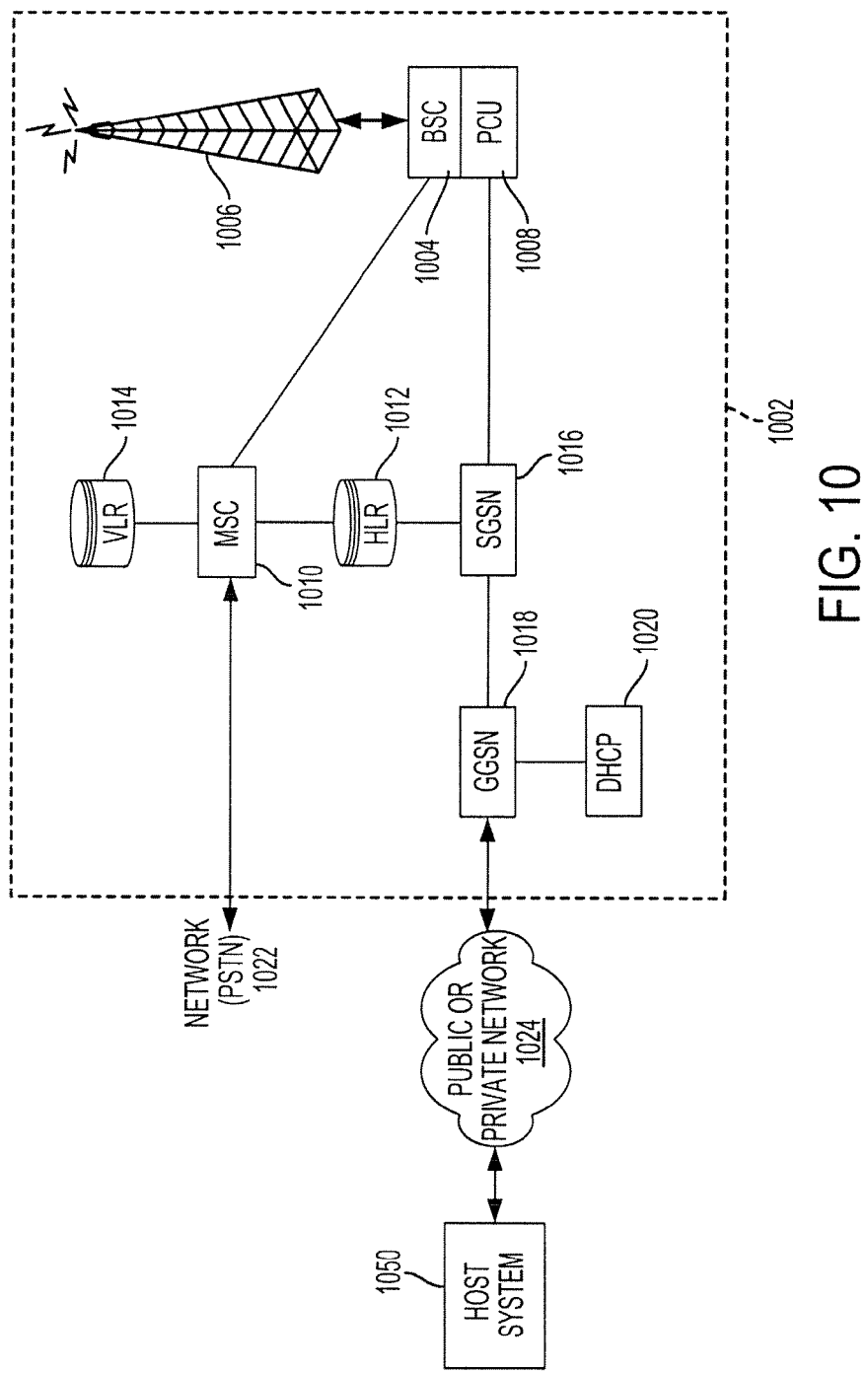
FIG. 10 is a block diagram of an exemplary node of a wireless network in accordance with an embodiment disclosed herein.

Referring to FIG. 10, a block diagram of an exemplary implementation of a node 1002 of the wireless network 850 is shown. In practice, the wireless network 850 comprises one or more nodes 1002. In conjunction with the connect module 844, the mobile device 800 can communicate with the node 1002 within the wireless network 850. In the exemplary implementation of FIG. 10, the node 1002 is configured in accordance with General Packet Radio Service (GPRS) and Global Systems for Mobile (GSM) technologies. The node 1002 includes a base station controller (BSC) 1004 with an associated tower station 1006, a Packet Control Unit (PCU) 1008 added for GPRS support in GSM, a Mobile Switching Center (MSC) 1010, a Home Location Register (HLR) 1012, a Visitor Location Registry (VLR) 1014, a Serving GPRS Support Node (SGSN) 1016, a Gateway GPRS Support Node (GGSN) 1018, and a Dynamic Host Configuration Protocol (DHCP) 1020. This list of components is not meant to be an exhaustive list of the components of every node 1002 within a GSM/GPRS network, but rather a list of components that are commonly used in communications through the network 850.

In a GSM network, the MSC 1010 is coupled to the BSC 1004 and to a landline network, such as a Public Switched Telephone Network (PSTN) 1022 to satisfy circuit switched requirements. The connection through the PCU 1008, the SGSN 1016 and the GGSN 1018 to a public or private network (Internet) 1024 (also referred to herein generally as a shared network infrastructure) represents the data path for GPRS capable mobile devices. In a GSM network extended with GPRS capabilities, the BSC 1004 also contains the Packet Control Unit (PCU) 1008 that connects to the SGSN 1016 to control segmentation, radio channel allocation and to satisfy packet switched requirements. To track the location of the mobile device 800 and availability for both circuit switched and packet switched management, the HLR 1012 is shared between the MSC 1010 and the SGSN 1016. Access to the VLR 1014 is controlled by the MSC 1010.

The station 1006 is a fixed transceiver station and together with the BSC 1004 form fixed transceiver equipment. The fixed transceiver equipment provides wireless network coverage for a particular coverage area commonly referred to as a "cell". The fixed transceiver equipment transmits communication signals to and receives communication signals from mobile devices within its cell via the station 1006. The fixed transceiver equipment normally performs such functions as modulation and possibly encoding and/or encryption of signals to be transmitted to the mobile device 800 in accordance with particular, usually predetermined, communication protocols and parameters, under control of its controller. The fixed transceiver equipment similarly demodulates and possibly decodes and decrypts, if necessary, any communication signals received from the mobile device 800 within its cell. Communication protocols and parameters may vary between different nodes. For example, one node may employ a different modulation scheme and operate at different frequencies than other nodes.

For all mobile devices 800 registered with a specific network, permanent configuration data such as a user profile is stored in the HLR 1012. The HLR 1012 also contains location information for each registered mobile device and can be queried to determine the current location of a mobile device. The MSC 1010 is responsible for a group of location areas and stores the data of the mobile devices currently in its area of responsibility in the VLR 1014. Further, the VLR 1014 also contains information on mobile devices that are visiting other networks. The information in the VLR 1014 includes part of the permanent mobile device data transmitted from the HLR 1012 to the VLR 1014 for faster access. By moving additional information from a remote HLR 1012 node to the VLR 1014, the amount of traffic between these nodes can be reduced so that voice and data services can be provided with faster response times and at the same time requiring less use of computing resources.

The SGSN 1016 and the GGSN 1018 are elements added for GPRS support; namely packet switched data support, within GSM. The SGSN 1016 and the MSC 1010 have similar responsibilities within the wireless network 850 by keeping track of the location of each mobile device 800. The SGSN 1016 also performs security functions and access control for data traffic on the wireless network 800. The GGSN 1018 provides internetworking connections with external packet switched networks and connects to one or more SGSN's 1016 via an Internet Protocol (IP) backbone network operated within the network 850. During normal operations, a given mobile device 800 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring the DHCP server 1020 connected to the GGSN 1018. There are many mechanisms for dynamic IP assignment, including using a combination of a Remote Authentication Dial-In User Service (RADIUS) server and a DHCP server. Once the GPRS Attach is complete, a logical connection is established from a mobile device 800, through the PCU 1008, and the SGSN 1016 to an Access Point Node (APN) within the GGSN 1018. The APN represents a logical end of an IP tunnel that can either access direct Internet compatible services or private network connections. The APN also represents a security mechanism for the network 850, insofar as each mobile device 800 must be assigned to one or more APNs and mobile devices 800 cannot exchange data without first performing a GPRS Attach to an APN that it has been authorized to use. The APN may be considered to be similar to an Internet domain name such as "myconnection.wireless.com".

Once the GPRS Attach operation is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 850. To maximize use of the PDP Contexts, the network 800 will run an idle timer for each PDP Context to determine if there is a lack of activity. When a mobile device 800 is not using its PDP Context, the PDP Context can be de-allocated and the IP address returned to the IP address pool managed by the DHCP server 1020.

Figure 11:
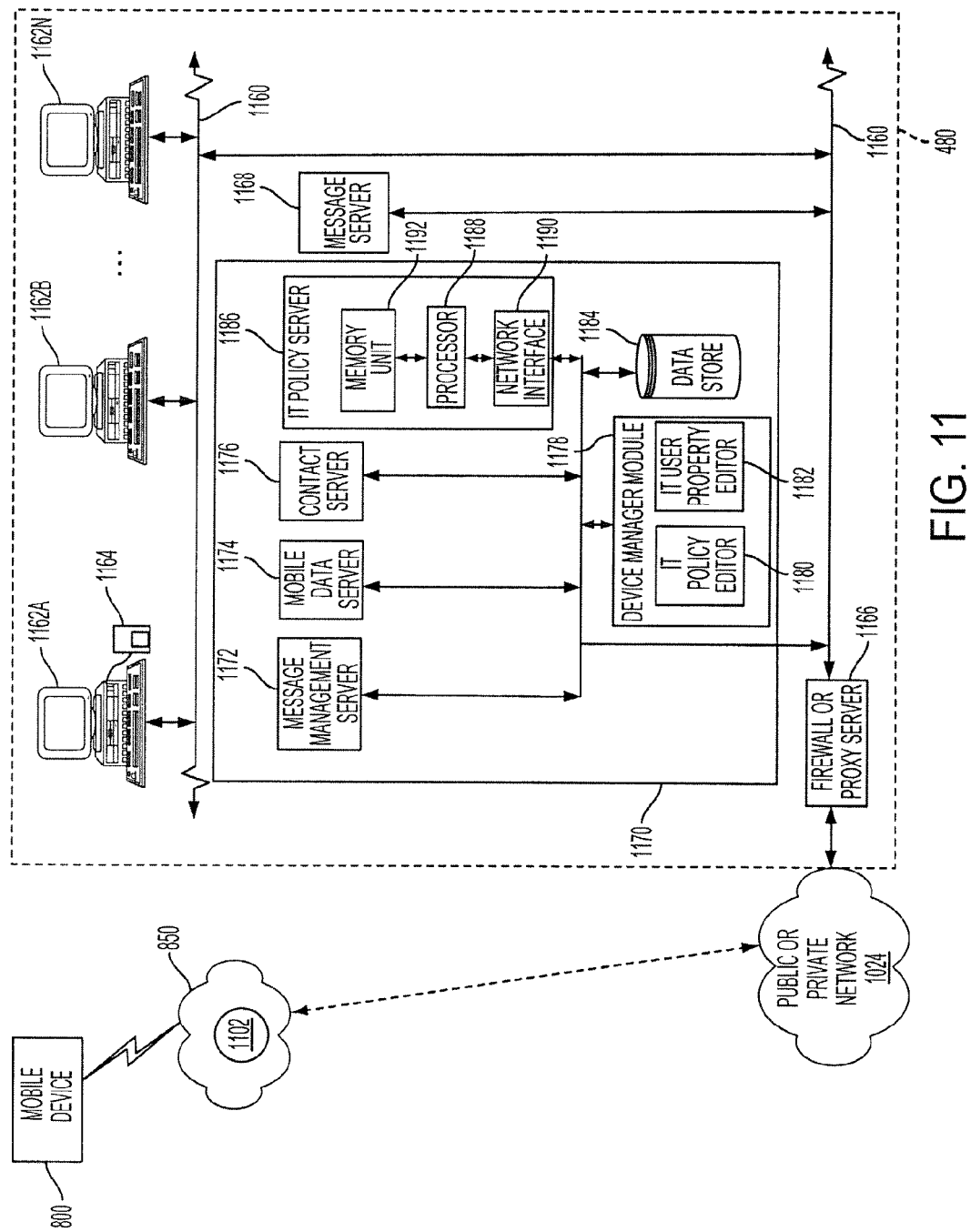
FIG. 11 is a block diagram illustrating components of a host system in one exemplary configuration for use with the wireless network of FIG. 10 and the mobile device of FIG. 8.

Referring to FIG. 11, shown therein is a block diagram illustrating components of an exemplary configuration of a host system 480 that the mobile device 800 can communicate with in conjunction with the connect module 844. The host system 480 will typically be a corporate enterprise or other local area network (LAN), but may also be a home office computer or some other private system, for example, in variant implementations. In this example shown in FIG. 11, the host system 480 is depicted as a LAN of an organization to which a user of the mobile device 800 belongs. Typically, a plurality of mobile devices can communicate wirelessly with the host system 480 through one or more nodes 1002 of the wireless network 850.

The host system 480 comprises a number of network components connected to each other by a network 1160. For instance, a user's desktop computer 1162a with an accompanying cradle 1164 for the user's mobile device 800 is situated on a LAN connection. The cradle 1164 for the mobile device 800 can be coupled to the computer 1162a by a serial or a Universal Serial Bus (USB) connection, for example. Other user computers 1162b-1162n are also situated on the network 1160, and each may or may not be equipped with an accompanying cradle 1164. The cradle 1164 facilitates the loading of information (e.g. PIM data, private symmetric encryption keys to facilitate secure communications) from the user computer 1162a to the mobile device 800, and may be particularly useful for bulk information updates often performed in initializing the mobile device 800 for use. The information downloaded to the mobile device 800 may include certificates used in the exchange of messages.

It will be understood by persons skilled in the art that the user computers 1162a-1162n will typically also be connected to other peripheral devices, such as printers, etc. which are not explicitly shown in FIG. 11. Furthermore, only a subset of network components of the host system 480 are shown in FIG. 11 for ease of exposition, and it will be understood by persons skilled in the art that the host system 480 will comprise additional components that are not explicitly shown in FIG. 11 for this exemplary configuration. More generally, the host system 480 may represent a smaller part of a larger network (not shown) of the organization, and may comprise different components and/or be arranged in different topologies than that shown in the exemplary embodiment of FIG. 11.

To facilitate the operation of the mobile device 800 and the wireless communication of messages and message-related data between the mobile device 800 and components of the host system 480, a number of wireless communication support components 1170 can be provided. In some implementations, the wireless communication support components 1170 can include a message management server 1172, a mobile data server 1174, a contact server 1176, and a device manager module 1178. The device manager module 1178 includes an IT Policy editor 1180 and an IT user property editor 1182, as well as other software components for allowing an IT administrator to configure the mobile devices 800. In an alternative embodiment, there may be one editor that provides the functionality of both the IT policy editor 1180 and the IT user property editor 1182. The support components 1170 also include a data store 1184, and an IT policy server 1186. The IT policy server 286 includes a processor 1188, a network interface 1190 and a memory unit 1192. The processor 1188 controls the operation of the IT policy server 1186 and executes functions related to the standardized IT policy as described below. The network interface 1190 allows the IT policy server 1186 to communicate with the various components of the host system 480 and the mobile devices 800. The memory unit 1192 can store functions used in implementing the IT policy as well as related data. Those skilled in the art know how to implement these various components. Other components may also be included as is well known to those skilled in the art. Further, in some implementations, the data store 1184 can be part of any one of the servers.

In this exemplary embodiment, the mobile device 800 communicates with the host system 480 through node 1002 of the wireless network 850 and a shared network infrastructure 1124 such as a service provider network or the public Internet. Access to the host system 480 may be provided through one or more routers (not shown), and computing devices of the host system 480 may operate from behind a firewall or proxy server 1166. The proxy server 1166 provides a secure node and a wireless internet gateway for the host system 480. The proxy server 1166 intelligently routes data to the correct destination server within the host system 480.

In some implementations, the host system 480 can include a wireless VPN router (not shown) to facilitate data exchange between the host system 480 and the mobile device 800. The wireless VPN router allows a VPN connection to be established directly through a specific wireless network to the mobile device 800. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 800 in this alternative implementation.

Messages intended for a user of the mobile device 800 are initially received by a message server 1168 of the host system 480. Such messages may originate from any number of sources. For instance, a message may have been sent by a sender from the computer 1162*b* within the host system 480, from a different mobile device (not shown) connected to the wireless network 850 or a different wireless network, or from a different computing device, or other device capable of sending messages, via the shared network infrastructure 1124, possibly through an application service provider (ASP) or Internet service provider (ISP), for example.

The message server 1168 typically acts as the primary interface for the exchange of messages, particularly e-mail messages, within the organization and over the shared network infrastructure 1124. Each user in the organization that has been set up to send and receive messages is typically associated with a user account managed by the message server 1168. Some exemplary implementations of the message server 1168 include a Microsoft Exchange™ server, a Lotus Domino™ server, a Novell Groupwise™ server, or another suitable mail server installed in a corporate environment. In some implementations, the host system 480 may comprise multiple message servers 1168. The message server 1168 may also be adapted to provide additional functions beyond message management, including the management of data associated with calendars and task lists, for example.

When messages are received by the message server 1168, they are typically stored in a data store associated with the message server 1168. In at least some embodiments, the data store may be a separate hardware unit, such as data store 1184, that the message server 1168 communicates with. Messages can be subsequently retrieved and delivered to users by accessing the message server 1168. For instance, an e-mail client application operating on a user's computer 1162*a* may request the e-mail messages associated with that user's account stored on the data store associated with the message server 1168. These messages are then retrieved from the data store and stored locally on the computer 1162*a*. The data store associated with the message server 1168 can store copies of each message that is locally stored on the mobile device 800. Alternatively, the data store associated with the message server 1168 can store all of the messages for the user of the mobile device 800 and only a smaller number of messages can be stored on the mobile device 800 to conserve memory. For instance, the most recent messages (i.e., those received in the past two to three months for example) can be stored on the mobile device 800.

When operating the mobile device 800, the user may wish to have e-mail messages retrieved for delivery to the mobile device 800. The message application 838 operating on the mobile device 800 may also request messages associated with the user's account from the message server 1168. The message application 838 may be configured (either by the user or by an administrator, possibly in accordance with an organization's information technology (IT) policy) to make this request at the direction of the user, at some pre-defined time interval, or upon the occurrence of some pre-defined event. In some implementations, the mobile device 800 is assigned its own e-mail address, and messages addressed specifically to the mobile device 800 are automatically redirected to the mobile device 800 as they are received by the message server 1168.

The message management server 1172 can be used to specifically provide support for the management of messages, such as e-mail messages, that are to be handled by mobile devices. Generally, while messages are still stored on the message server 1168, the message management server 1172 can be used to control when, if, and how messages are sent to the mobile device 800. The message management server 1172 also facilitates the handling of messages composed on the mobile device 800, which are sent to the message server 1168 for subsequent delivery.

For example, the message management server 1172 may monitor the user's "mailbox" (e.g. the message store associated with the user's account on the message server 1168) for new e-mail messages, and apply user-definable filters to new messages to determine if and how the messages are relayed to the user's mobile device 800. The message management server 1172 may also compress and encrypt new messages (e.g. using an encryption technique such as Data Encryption Standard (DES), Triple DES, or Advanced Encryption Standard (AES)) and push them to the mobile device 800 via the shared network infrastructure 1124 and the wireless network 850. The message management server 1172 may also receive messages composed on the mobile device 800 (e.g. encrypted using Triple DES), decrypt and decompress the composed messages, re-format the composed messages if desired so that they will appear to have originated from the user's computer 1162*a*, and re-route the composed messages to the message server 1168 for delivery.

Certain properties or restrictions associated with messages that are to be sent from and/or received by the mobile device 800 can be defined (e.g. by an administrator in accordance with IT policy) and enforced by the message management server 1172. These may include whether the mobile device

800 may receive encrypted and/or signed messages, minimum encryption key sizes, whether outgoing messages must be encrypted and/or signed, and whether copies of all secure messages sent from the mobile device 800 are to be sent to a pre-defined copy address, for example.

The message management server 1172 may also be adapted to provide other control functions, such as only pushing certain message information or pre-defined portions (e.g. "blocks") of a message stored on the message server 1168 to the mobile device 800. For example, in some cases, when a message is initially retrieved by the mobile device 800 from the message server 1168, the message management server 1172 may push only the first part of a message to the mobile device 800, with the part being of a pre-defined size (e.g. 2 KB). The user can then request that more of the message be delivered in similar-sized blocks by the message management server 1172 to the mobile device 800, possibly up to a maximum pre-defined message size. Accordingly, the message management server 1172 facilitates better control over the type of data and the amount of data that is communicated to the mobile device 800, and can help to minimize potential waste of bandwidth or other resources.

The mobile data server 1174 encompasses any other server that stores information that is relevant to the corporation. The mobile data server 1174 may include, but is not limited to, databases, online data document repositories, customer relationship management (CRM) systems, or enterprise resource planning (ERP) applications.

The contact server 1176 can provide information for a list of contacts for the user in a similar fashion as the address book on the mobile device 800. Accordingly, for a given contact, the contact server 1176 can include the name, phone number, work address and e-mail address of the contact, among other information. The contact server 1176 can also provide a global address list that contains the contact information for all of the contacts associated with the host system 480.

It will be understood by persons skilled in the art that the message management server 1172, the mobile data server 1174, the contact server 1176, the device manager module 1178, the data store 1184 and the IT policy server 1186 do not need to be implemented on separate physical servers within the host system 480. For example, some or all of the functions associated with the message management server 1172 may be integrated with the message server 1168, or some other server in the host system 480. Alternatively, the host system 840 may comprise multiple message management servers 1172, particularly in variant implementations where a large number of mobile devices need to be supported.

Alternatively, in some embodiments, the IT policy server 1186 can provide the IT policy editor 1180, the IT user property editor 1182 and the data store 1184. In some cases, the IT policy server 1186 can also provide the device manager module 1178. The processor 1188 can execute the editors 1180 and 1182. In some cases, the functionality of the editors 1180 and 1182 can be provided by a single editor. In some cases, the memory unit 1192 can provide the data store 1184.

The device manager module 1178 provides an IT administrator with a graphical user interface with which the IT administrator interacts to configure various settings for the mobile devices 800. As mentioned, the IT administrator can use IT policy rules to define behaviors of certain applications on the mobile device 800 that are permitted such as phone, web browser or Instant Messenger use. The IT policy rules can also be used to set specific values for configuration settings that an organization requires on the mobile devices 800 such as auto signature text, WLAN/VoIP/VPN configuration, security requirements (e.g. encryption algorithms, password rules, etc.), specifying themes or applications that are allowed to run on the mobile device 800, and the like.

While preferred embodiments have been specifically described and illustrated herein, it should be apparent that many modifications to the embodiments can be made. For example, while the preferred embodiments illustrated herein have been limited to the processing of voice (packet or circuit switched) calls, it should be readily apparent that any form of call (e.g., audio, video, data) may be processed through server 30 to any communication device (e.g., cellular phone, pager, office/residential landline telephone, computer terminal, personal digital assistant (PDA), RIM device, etc.). The individual method steps of the exemplary operational flows illustrated in FIGS. 6A and 6D may be interchanged in order, combined, replaced or even added. Any number of different operations not illustrated herein may be performed utilizing the invention. Moreover, the method steps may be performed by hardware, software, firmware or any combinations of hardware, software, firmware or logic elements.

In addition, while the illustrated embodiments have demonstrated implementations using PBX-based communication systems, it should be readily apparent that the server module may be connected (directly, indirectly, co-located, or remotely) with any other network switching device or communication system used to process calls such as a central switching office, centrex system, or Internet server for telephone calls made over the public switched telephone network, private telephone networks, or even Internet Protocol (IP) telephony networks made over the Internet. It should be understood by those skilled in the art that the embodiments disclosed do not need a PBX to operate or to perform any of the processing described above. All that is required is a properly programmed server 30.

It should be apparent that, while only PRI lines (e.g., between PBX 14 and server 30, between PBX 14 and PSTN 16) have been illustrated in discussing the preferred embodiments, these communication lines (as well as any other communication lines or media discussed herein) may be of any form, format, or medium (e.g., PRI, T1, OC3, electrical, optical, wired, wireless, digital, analog, etc.). Moreover, although PSTN 16, 54 are depicted as separate networks for illustration purposes, it should be readily apparent that a single PSTN network alone may be used in practice. It should be noted that the server 30 could trunk back to the PBX 14 instead of being directly connected to the PSTN 54. The use of a commercial wireless carrier network (represented by wireless switch 58 and antenna 60) as described herein may be implemented using one or more commercial carriers using the same or different signaling protocols (e.g., Sprint/Nextel, etc.) depending on the communication devices registered with the system.

The modules described herein such as the modules making up server 30, as well as server 30 and PBX 14 themselves, may be one or more hardware, software, or hybrid components residing in (or distributed among) one or more local or remote systems. It should be readily apparent that the modules may be combined (e.g., server 30 and PBX 14) or further separated into a variety of different components, sharing different resources (including processing units, memory, clock devices, software routines, etc.) as required for the particular implementation of the embodiments disclosed herein. Indeed, even a single general purpose computer executing a computer program stored on a recording medium to produce the functionality and any other memory devices referred to herein may be utilized to implement the illustrated embodiments. User interface devices utilized by in or in conjunction with server 30 may be any device used to input and/or output information. The interface devices may be implemented as a graphical user interface (GUI) containing a display or the like, or may be a link to other user input/output devices known in the art.

Furthermore, memory units employed by the system may be any one or more of the known storage devices (e.g., Random Access Memory (RAM), Read Only Memory (ROM), hard disk drive (HDD), floppy drive, zip drive, compact disk-ROM, DVD, bubble memory, etc.), and may also be one or more memory devices embedded within a CPU, or shared with one or more of the other components.

Specific embodiments and applications related to the above description include, but are not limited to, a computer implemented method of initiating a conference. The method comprises the steps of inputting a conference request via a data message, where the request comprises at least a scheduled time for the conference and inputting responses to the request to determine conference participants. In addition, at the scheduled time, the method retrieves contact information for the conference participants and initiates at least one telephone call to each conference participant based on each participant's contact information.

An additional embodiment provides a server computer comprising means for inputting a conference request via a data message, the request comprising at least a scheduled time for the conference and means for inputting responses to the request to determine conference participants. The server further comprises means for retrieving contact information for the conference participants at the scheduled time and means for initiating at least one telephone call to each conference participant based on each participant's contact information.

Yet another embodiment described above provides a client application program comprising instructions that when executed by a computer causes the computer to perform a method of initiating a conference call. The method includes the steps of displaying a first scheduling option for requesting a conference call and, in response to a selection of the first scheduling option, displaying a second scheduling option for setting when the conference call will occur, selecting desired participants of the conference call and setting the type of conference call. The second scheduling option includes a third scheduling option for scheduling the call. In response to a selection of the third scheduling option, a step of sending a data message comprising a start time of the call, the type of call and a set of participants for the call is performed.

As set forth above, a telecommunications system is also provided. The system includes a computer readable storage medium having a database comprising a plurality of user profiles, each profile being associated with a respective telephone number of the system and a processor connected to said storage medium. The processor is configured to initiate a conference call by inputting a conference request via a data message, the request comprising at least a scheduled time for the conference and a type of conference and inputting responses to the request to determine accepted conference participants.

Another embodiment provides another method of initiating a conference. The method includes the act of initiating a conference by inputting a conference request via a data message, where the request comprises a scheduled time for the conference and a type of conference. The method also includes the act of inputting responses to the request to determine accepted conference participants.

Another embodiment disclosed above provides a client application program comprising instructions that when executed by a computer causes the computer to perform a method of initiating a conference. The method includes the steps of displaying a calendar page on a display device and displaying an option for requesting a conference. When an input is received indicating that a conference has been requested, the method displays a page for setting when the conference will occur, for selecting desired participants of the conference and for setting the type of conference call. When a request to schedule the conference is input, the method sends a data message to an external device, wherein the message comprises a start time of the conference, the type of conference and a set of participants for the conference.

What is claimed as new and desired to be protected by Letters Patent of the United States is:

1. A computer implemented method of initiating a conference call via a server that assists with scheduling the conference call, said method comprising:
   receiving a conference request from an inviter's communication device, the request comprising conference settings including at least a scheduled time for the conference call;
   sending at least one invitation message based on the conference request;
   receiving responses to the at least one invitation message to determine conference participants;
   automatically synchronizing the conference settings and a personal conference group based on communication with the inviter's communication device, wherein the personal conference group is created by the inviter's communication device based on communication between the inviter's communication device and the server, and wherein the personal conference group is synchronized based on inviter's change of the conference settings;
   and
   initiating at least one conference call to each conference participant based on each participant's contact information associated with the personal conference group.

2. The method of claim 1, wherein the conference request is received via a data message, the data message being an email message generated by a calendar function of the email application of the inviter's communication device.

3. The method of claim 1, further comprising the step of connecting together calls to conference participants that have been answered to form the conference call.

4. The method of claim 1, further comprising:
   determining whether more than one call should be made to a respective conference participant; and
   if it is determined that more than one call should be made to the respective conference participant, initiating more than one telephone call to the respective conference participant based on the respective participant's contact information.

5. The method of claim 1, further comprising:
   determining whether more than one call should be made to a respective conference participant; and
   if it is determined that more than one call should be made to the respective conference participant, simultaneously initiating more than one telephone call to the respective conference participant based on the respective participant's contact information.

6. A computer implemented method of initiating a conference call via a user device that can participate on the conference call, said method comprising:
   displaying a first scheduling option for requesting the conference call;
   in response to a selection of the first scheduling option, displaying a second scheduling option for setting when the conference call will occur and for selecting desired participants of the conference call, said second scheduling option comprising a third scheduling option for scheduling the conference call;

in response to a selection of the third scheduling option, sending a conference request comprising conference settings including a start time of the conference call and a set of participants for the conference call; and automatically synchronizing the conference settings and a personal conference group based on communication with a server, wherein the personal conference group is created by the user device based on communication between the user device and the server, and wherein the personal conference group is synchronized based on inviter's change of the conference settings.

7. The method of claim 6, wherein the conference request is received via a data message, the data message being generated by a calendar function of an email application of the user device.

8. The method of claim 7, wherein the first scheduling option is a menu option for setting an appointment on the email application and the second scheduling option is a new conference appointment screen allowing a user to supply a date and time when the conference call will occur, set the type of conference call, and email addresses of desired participants of the conference call.

9. The method of claim 8, wherein the new conference appointment screen also contains an area for a text message associated with the conference call.

10. The method of claim 8, wherein the type of conference call comprises a get me conference wherein the server initiates the conference by calling participants that have agreed to participate on the conference call.

11. The method of claim 7, wherein the personal conference group comprises participants of the conference call and their respective contact information.

12. A telecommunications system that assists with scheduling a conference call, the telecommunication system comprising:

a non-transitory computer readable storage medium having a database comprising a plurality of user profiles, each user profile being associated with a respective telephone number of the system; and a processor connected to said storage medium and being configured to initiate the conference call by:

receiving a conference request from an inviter's communication device, the request comprising conference settings including at least a scheduled time for the conference and a type of conference, sending at least one invitation message based on the conference request, receiving responses to the at least one invitation message to determine accepted conference participants, and automatically synchronizing the conference settings and a personal conference group based on communication with the inviter's communication device, wherein the personal conference group is created by the inviter's communication device based on communication between the inviter's communication device and the server, and wherein the personal conference group is synchronized based on inviter's change of the conference settings.

13. The telecommunications system of claim 12, wherein said processor is further configured to:

determine if the type of conference requires the processor to call accepted participants; and if it is determined that the type of conference requires the processor to call accepted participants, at the scheduled time, said processor retrieves contact information for each accepted conference participant and initiates at least one telephone call to each accepted conference participant based on the accepted participant's respective contact information.

14. The telecommunications system of claim 13, wherein the processor determines whether more than one call should be made to an accepted conference participant, and if it is determined that more than one call should be made to an accepted conference participant, the processor initiates more than one telephone call to the accepted conference participant based on the accepted conference participant's respective contact information.

15. The telecommunications system of claim 12, wherein the personal conference group comprises participants of the conference call and their respective contact information.

\* \* \* \* \*